United States Patent
Yokoi

(10) Patent No.: US 8,573,765 B2
(45) Date of Patent: Nov. 5, 2013

(54) ACTIVE RADIATION CURABLE INK COMPOSITION, INK COMPOSITION FOR INKJET RECORDING, PRINTED MATTER, AND METHOD OF PRODUCING MOLDED ARTICLE OF PRINTED MATTER

(75) Inventor: Kazuhiro Yokoi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 252 days.

(21) Appl. No.: 13/074,039

(22) Filed: Mar. 29, 2011

(65) Prior Publication Data

US 2011/0241264 A1    Oct. 6, 2011

(30) Foreign Application Priority Data

Mar. 31, 2010    (JP) .................................. 2010-083844

(51) Int. Cl.
    *C09D 11/00*    (2006.01)
(52) U.S. Cl.
    USPC .............................. 347/102; 347/95; 347/100
(58) Field of Classification Search
    USPC ........ 347/21, 28, 95–100, 102; 523/160, 161; 106/31.13, 31.27, 31.6
    See application file for complete search history.

(56) References Cited

U.S. PATENT DOCUMENTS

| | | | |
|---|---|---|---|
| 2006/0166137 A1* | 7/2006 | Mitsumoto et al. | 430/270.1 |
| 2009/0142507 A1* | 6/2009 | Yokoi et al. | 427/504 |
| 2009/0197055 A1* | 8/2009 | Yokoi | 428/195.1 |
| 2009/0202795 A1* | 8/2009 | Hayata et al. | 428/195.1 |
| 2009/0214797 A1* | 8/2009 | Kasai | 427/511 |
| 2010/0075061 A1* | 3/2010 | Yokoi | 427/487 |
| 2011/0134411 A1* | 6/2011 | Mitsumoto et al. | 355/77 |
| 2012/0076950 A1* | 3/2012 | Kodama | 427/553 |

FOREIGN PATENT DOCUMENTS

| | | |
|---|---|---|
| EP | 1903080 A1 | 3/2008 |
| EP | 1983017 A1 | 10/2008 |
| JP | 2002-167537 A | 6/2002 |
| JP | 2004-149755 A | 5/2004 |
| JP | 2007-119723 A | 5/2007 |
| JP | 2009-073881 A | 4/2009 |

OTHER PUBLICATIONS

Corresponding EPO Official communication.

* cited by examiner

*Primary Examiner* — Matthew Luu
*Assistant Examiner* — Rut Patel
(74) *Attorney, Agent, or Firm* — SOLARIS Intellectual Property Group, PLLC

(57) ABSTRACT

The present invention provides an active radiation curable ink composition including: (A) a polymer having two or more acidic groups or two or more basic groups; (B) a polymerizable monomer having a substituent group capable of forming a counter salt with the acidic group or basic group of the polymer (A); (C) a photo-polymerization initiator; and (D) a polymerizable monomer having a different structure from the polymerizable monomer (B).

8 Claims, 1 Drawing Sheet

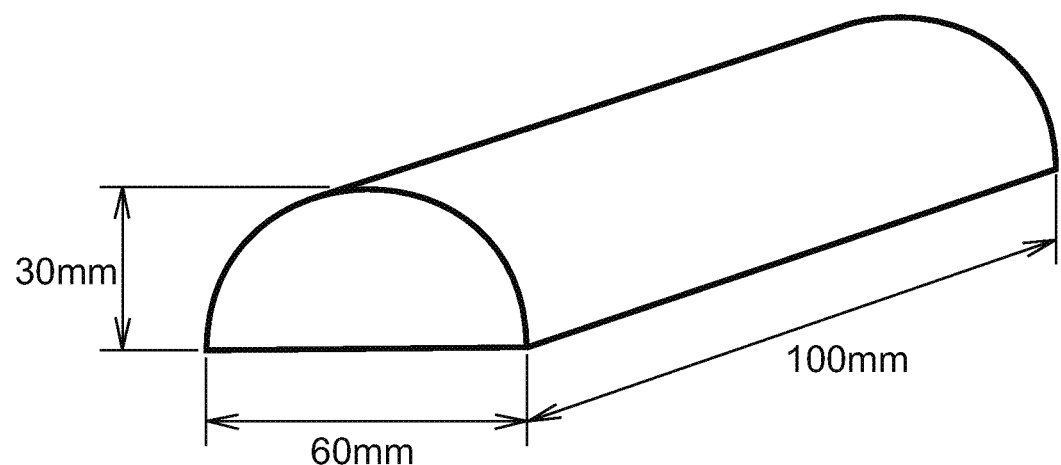

ACTIVE RADIATION CURABLE INK COMPOSITION, INK COMPOSITION FOR INKJET RECORDING, PRINTED MATTER, AND METHOD OF PRODUCING MOLDED ARTICLE OF PRINTED MATTER

CROSS-REFERENCE TO RELATED APPLICATION

This application claims priority under 35 USC 119 from Japanese Patent Application No. 2010-083844 filed on Mar. 31, 2010, the disclosure of which is incorporated by reference herein.

BACKGROUND OF THE INVENTION

Field of the Invention

The present invention relates to an active radiation curable ink composition, an ink composition for inkjet recording, a printed matter, and a method of producing a molded article of printed matter.

Various methods such as electrophotographic methods, sublimation-type thermal transfer methods, fusion-type thermal transfer methods, and inkjet methods are known as image recording methods in which images are formed on recording media, such as a paper, according to image data signals. For example, an inkjet method is an excellent image recording method because it can be carried out using inexpensive apparatus, it enables efficient use of ink and lower running costs since an image is directly formed on a recording medium by ejecting ink droplets only onto the region in which the image is to be formed, and it is less noisy.

The ink-jetting method enables printing not only on a plain paper, but also non-water-absorbing recording media such as plastic sheets and metal plates. However, high speed printing and high quality images have been issues needed to be addressed, and the time periods required for drying and curing the ink droplets printed by the inkjet method significantly affect, for example, productivity of printed matter, sharpness of a printed image, and the like.

A recording method of using an active radiation curable ink composition for inkjet recording is known as one of ink jetting methods. According to the above recording method, the productivity of a print can be improved and a sharp mage can be formed by exposure to radiation immediately or in a finite period of time after injection of the ink, thereby curing ink droplets.

By increasing radiation sensitivity of the inkjet recording ink which can be cured by irradiation with radiation such as ultraviolet rays, a high curing property against the radiation is imparted to the ink, leading to various advantages such as improvement in productivity of inkjet recording, reduction in electrical consumption, longer life time of a radiation generator due to load reduction thereto, and prevention of evaporation of low-molecular-weight substances which may be caused by insufficient curing. In particular, by increasing the radiation sensitivity of the ink, the strength of an image formed from the inkjet recording ink is increased. However, the long-term storage stability of the ink is easily deteriorated, and it has been difficult to secure ejectionability (ejection property) at the time when the ink stored for a long period of time is ejected by ink-jetting.

In contrast, examples of preferable properties of images formed with ink include adhesiveness with a base material and flexibility of the image. In particular, the flexibility of the image becomes an important factor when the image is formed on the surface of an uneven (not flat) base material or a flexible base material, such or a resin film, or when a molded article of printed matte is manufactured such that a molded article is formed in a state where printing is performed on the surface, such as a resin bottle. However, it has been difficult to achieve a good balance between flexibility and curing properties. More specifically, there is a concern that an increase in the ratio of monofunctional monomers for improving flexibility causes reduction of the curing properties or stickiness of the image surface due to bleeding of uncured low molecular weight ingredients.

In order to improve adhesiveness, flexibility, and curing property, a technique in which a low-viscosity urethane acrylate is used in an inkjet ink composition has been suggested (see, for example, Japanese Patent Application Laid-Open (JP-A) No. 2002-167537).

In order to obtain a photopolymerization initiator composition which is cured at high sensitivity and has excellent storage stability, a technique is known in which a polyfunctional thiol compound having a specific structure is used as a component of a photopolymerization initiator composition for a photosensitive composition (see, for example, JP-A No. 2004-149755, or EP 1983017). A proposal of using an ambient-temperature molten salt for inks so as to improve long time storability thereof and to stabilize ink ejection even after long time storage has been made (see, for instance, JP-A No. 2009-73881).

Further, as a technique of securing a good balance between flexibility and sensitivity, an ink composition that includes therein a monofunctional (meth)acrylate having an acidic group and a monofunctional (meth)acrylate having a basic group has been proposed (for instance, see JP-A No. 2007-119723).

However, it is not enough improve storage stability of inks, sensitivity, flexibility of cured articles, and surface hardness of cured articles at the same time. It has been desired to develop a technique of improving these properties.

The present invention aims to address the above problems.

Namely, a purpose of the present invention is to provide an ink composition that forms a cured image with high surface hardness, excellent flexibility and excellent adhesion to a recording medium, and that has high ejection stability even after long time storage and high sensitivity. The ink composition is preferably used for ink-jet recording. Another purpose of the present invention is to provide a method of producing printed matter that is excellent in surface hardness, blocking resistance, stretching property, and adhesion in a case in which the printed matter is formed from the ink composition by inkjet recording; and a method of producing a molded article of printed matter.

SUMMARY OF THE INVENTION

According to a first aspect of the present invention, there is provided an active radiation curable ink composition including: a polymer (A) having two or more acidic groups or two or more basic groups; a polymerizable monomer (B) having a substituent group capable of forming a counter salt with the acidic groups or the basic groups of the polymer (A); a photopolymerization initiator (C); and a polymerizable monomer (D) having a different structure from the polymerizable monomer (B).

BRIEF DESCRIPTION OF DRAWINGS

FIG. 1 shows a wooden mold that is used for evaluation of vacuum-molding moldability of printed matter obtained from an ink composition of the present invention.

DETAILED DESCRIPTION OF THE INVENTION

The active radiation curable ink composition (hereinafter, appropriately referred to as "the ink composition") of the present invention includes: a polymer (A) (hereinafter, appropriately referred to as "the specific polymer") that has two or more acidic groups or two or more basic groups; a polymerizable monomer (B) (hereinafter, appropriately referred to as "specific monomer") that has a substituent group capable of forming a counter salt with the acidic groups or the basic groups of the polymer (A); a photo-polymerization initiator (C); and a polymerizable monomer (D) (hereinafter, appropriately referred to as "polymerizable monomer D") that has a different structure from the polymerizable monomer (B).

Hereinafter, each of components used for the ink composition of the present invention is described in detail. In addition, "molecular weight" used in the present specification represents "weight average molecular weight" if not otherwise mentioned.

Polymer (A) Having Two or More Acidic Groups or Two or More Basic Groups: Specific Polymer The ink composition of the present invention includes therein a polymer (A) (hereinafter, appropriately referred to as a specific polymer (A)) that has two or more acidic groups or two or more basic groups.

Any polymer may be used as the specific polymer (A) in the ink composition of the present invention as long as the polymer has two or more acidic groups or two or more basic groups in a molecule.

Any functional group may be used as the acidic groups of the specific polymer as long as the functional group has a dissociable proton having a pKa of less than 11. Considering interacting properties with a basic group containing monofunctional (meth)acrylic acid derivative that is described later or availability, a carboxyl group, a sulfonic acid group, a phenolic hydroxyl group, a phosphoric acid group, a phosphonic acid group, an aminosulfonyl group, an acetylacetonate group, and an active imide group as described in paragraphs of [0019] to [0043] of JP-A No. 2005-107112 are preferable. Considering liquid properties or curing property of the ink composition and flexibility after curing, the carboxyl group, the sulfonic acid group, and the phosphoric acid group are more preferable, and the carboxyl group is particularly preferable.

The two or more acidic groups of the specific polymer may be the same or different from each other as long as at least two acidic groups are included in a molecule. The acid value of the specific polymer is preferably from 1 mgKOH/g to 700 mgKOH/g, more preferably from 5 mgKOH/g to 400 mgKOH/g, and most preferably from 8 mgKOH/g to 200 mgKOH/g. A polymer that has acidic groups so that the acid value thereof meets the above condition (ranges) is preferable.

Any functional group may be favorably used as the basic groups of the specific polymer as long as the functional group is capable of forming a salt with an acidic group having a dissociable proton with a pKa of less than 11. Considering interacting properties with a later described ester or amide of a monofunctional (meth)acrylic acid that has an acidic group or availability, a functional group that has a basic nitrogen atom is preferable. From the viewpoint of stability of the ink composition or the like, an aliphatic amine structure or an aromatic amine structure is more preferable, and the aliphatic amine structure is particularly preferable.

As the aliphatic amine structure, a secondary or tertiary amine structure, which is substituted with a straight-chain, branched, or cyclic alkyl, alkenyl, or aralkyl group that has from 1 to 20 carbon atoms and may have a substituent group, is preferable. Examples of a preferred substituent group include a halogen atom; a hydroxyl group; an ether group; and an ester group.

As the aromatic amine structure, a secondary or tertiary amine structure, in which at least one of the hydrogen atoms of the amino group is substituted with an aromatic ring which may have a substituent group and from 6 to 20 carbon atoms and the remainder of the hydrogen atoms of the amino group is substituted with a straight-chain, branched, or cyclic alkyl group having from 1 to 20 carbon atoms. Examples of a preferred substituent group of the aromatic ring include an alkyl or alkoxy group having from 1 to 6 carbon atoms; a hydroxy group; and a halogen atom.

The two or more basic groups of the specific polymer may be the same or different from each other as long as at least two basic groups are included in a molecule. The amine value of the specific polymer is preferably from 1 mgKOH/g to 700 mgKOH/g, more preferably from 5 mgKOH/g to 400 mgKOH/g, and still more preferably from 8 mgKOH/g to 200 mgKOH/g. A polymer that has basic groups so that the amine value thereof meets the above condition (ranges) is preferable.

The acidic groups or the basic groups may be introduced into the specific polymer, for instance, by a method of copolymerizing polymerizable monomers having acidic groups or basic groups.

Specific examples of a monomer compound that is suitably used for the preparation of the specific polymer of the present invention and has acidic groups or basic groups in a molecule thereof include exemplified compounds of (Ba-1) to (Ba-18) and (Bb-1) to (Bb-14), which are a polymerizable monomer having acidic groups or a polymerizable monomer having basic groups as described below.

Further, a polymerizable monomer with an acidic group having the following structures may be also used for the preparation of the specific polymer of the present invention.

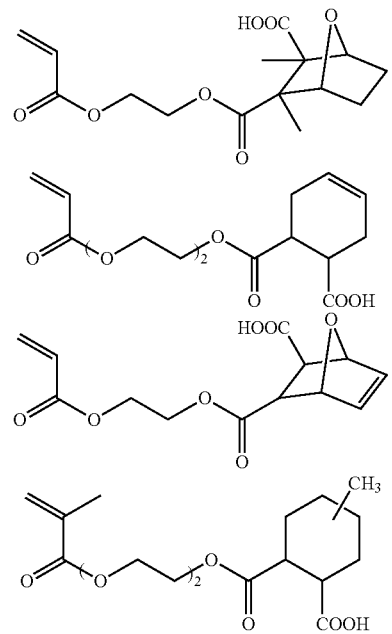

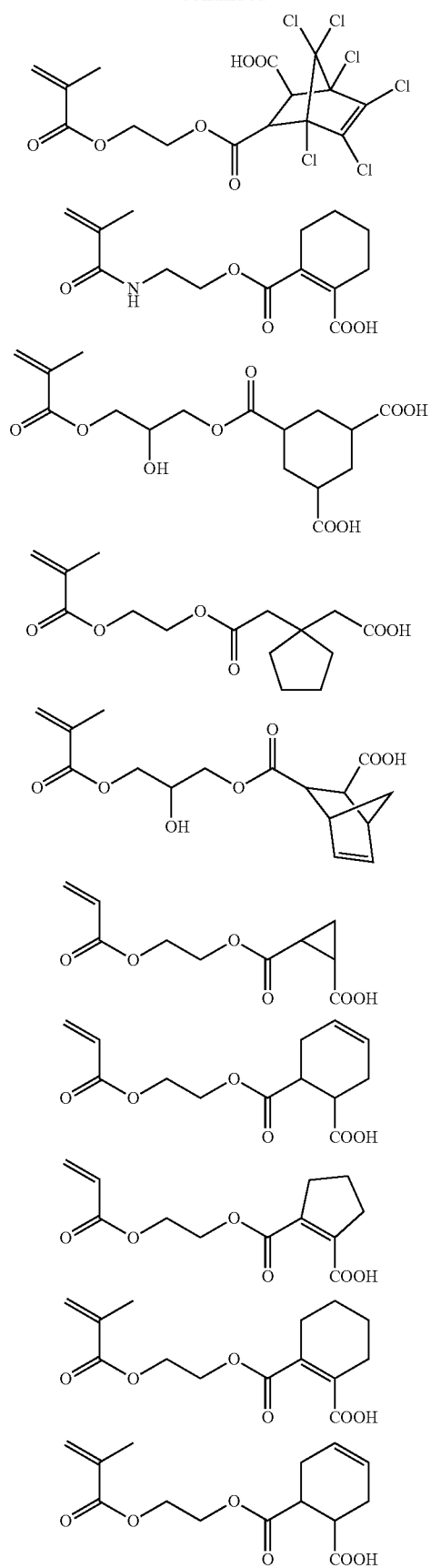
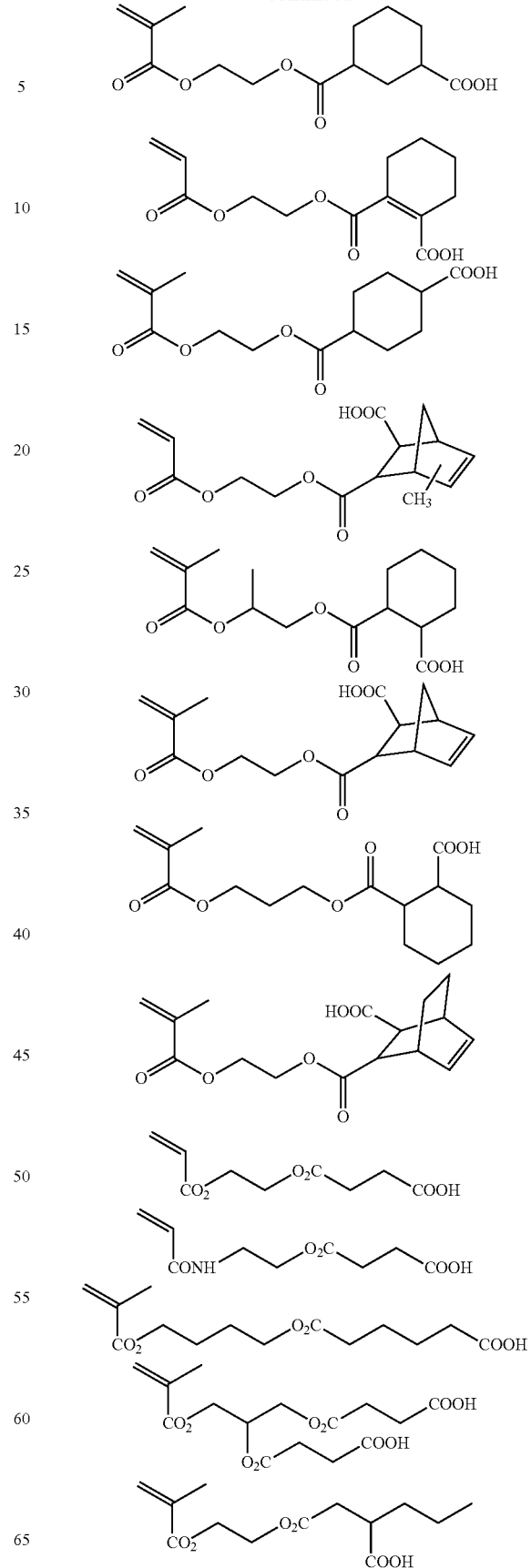

-continued

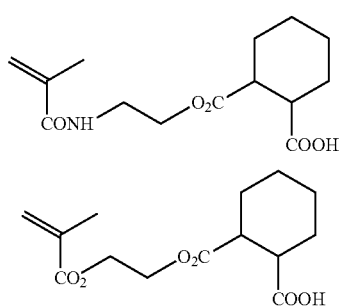
In addition, the acidic groups or the basic groups may be introduced into the specific polymer of the present invention through polycondensation. As a diol that is preferably used to introduce the acidic groups or the basic groups, the following compounds are usable, but they are not limitative.
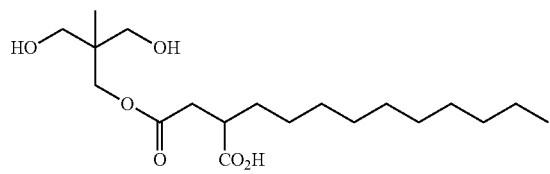
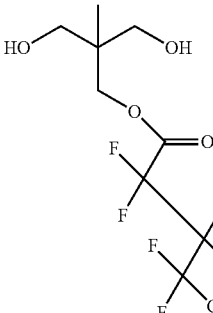
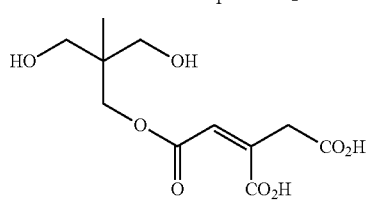
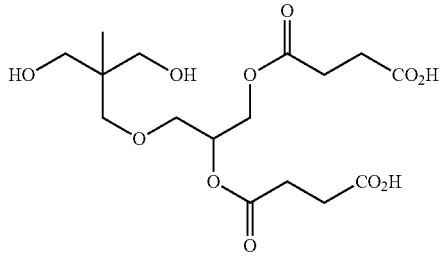
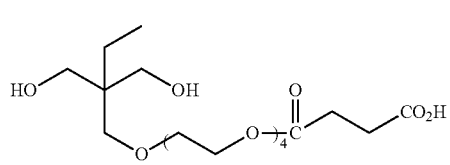
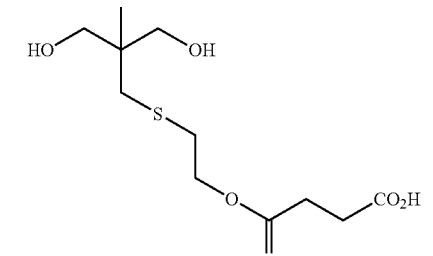
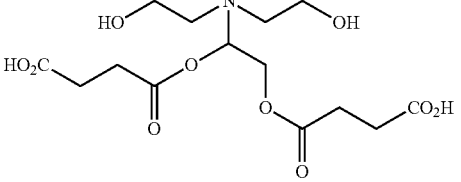
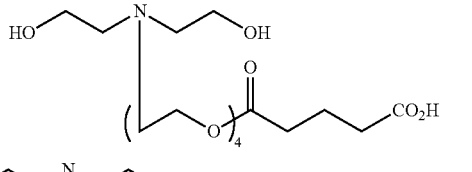
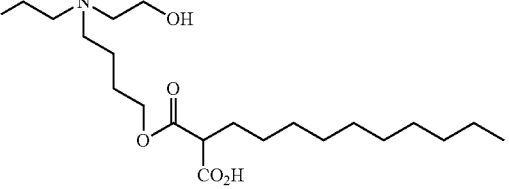
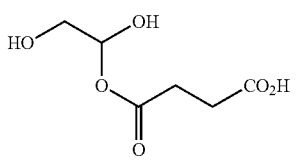
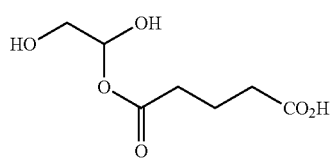
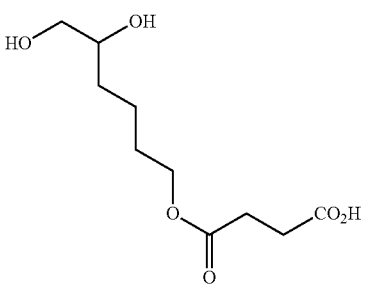
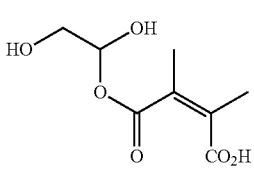

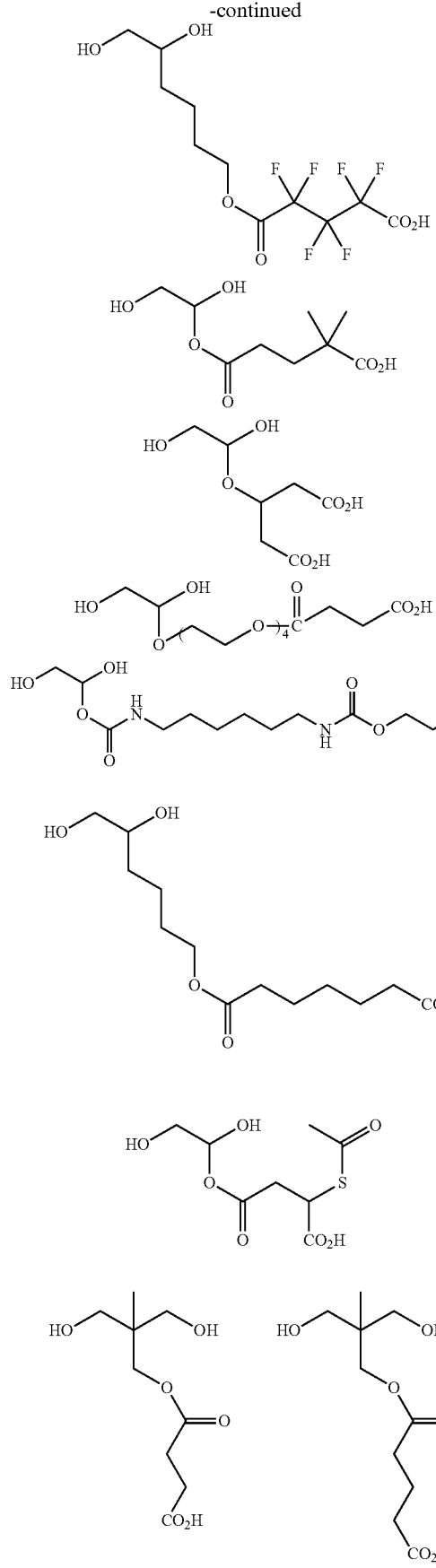
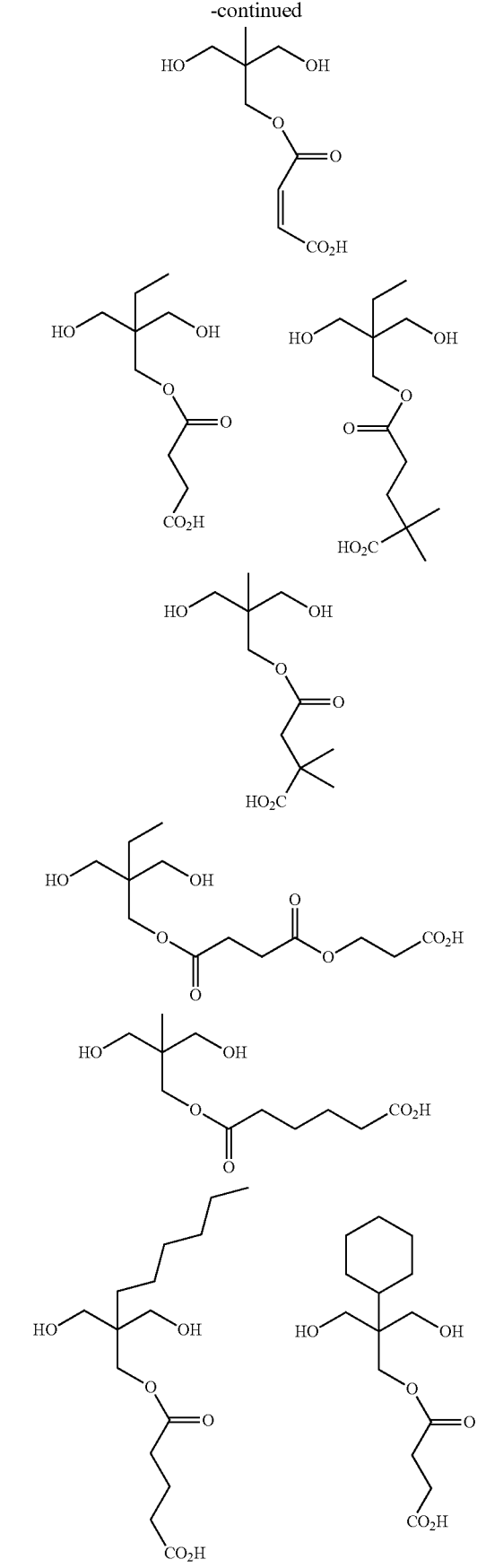

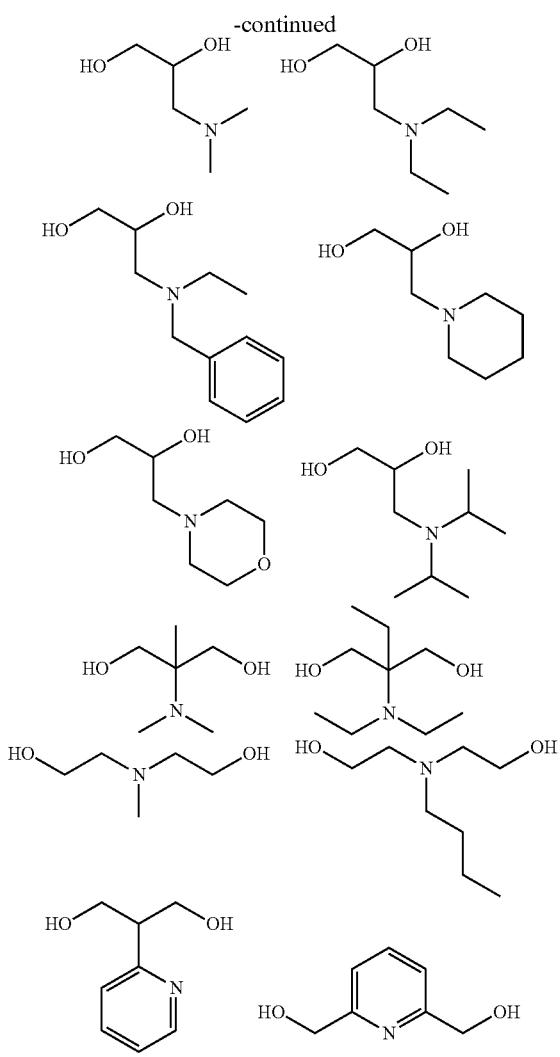

Besides the above described copolymerization and polycondensation, the other method may be used for preparing the specific polymer. Examples of an usable method include a method of adding an epoxy compound, an isocyanate compound, or the like, which includes an acidic group or a basic group therein, to a polymer that has an active hydrogen such as a hydroxyl group; and a method of hydrolyzing a protected acidic group such as maleic anhydride, or alternatively a basic group after polymerization.

Further, the acidic groups or basic groups may be introduced in any form including random copolymer, graft copolymer, and block copolymer. However, from the viewpoint of solubility, these groups may be introduced preferably in a form of random copolymer.

The length of a linking chain that connects the polymer main chain and the acidic group in the specific polymer is preferably from 3 to 20 in terms of number of atoms, more preferably from 6 to 20, and still more preferably from 8 to 20.

In the case of basic groups, the length of a linking chain that connects the polymer main chain and the basic group is preferably from 3 to 100 in terms of number of atoms, more preferably from 6 to 50, and still more preferably from 8 to 20.

By adjusting the length of the linking chain to the above ranges, reactivity of the polymerizable monomer (B) that forms a counter salt with the specific polymer may be kept high. Resultantly, favorable solubility may be attained and favorable strength of the film after curing of the ink composition may be attained.

The specific polymer of the present invention has two or more acidic groups or basic groups per molecule. As described above, the acidic groups or basic groups are introduced into the specific polymer by various methods including a method of copolymerizable a compound having an acidic group or a basic group. By using two or more molecules of a compound such as a polymerizable monomer that has an acidic group or a basic group, heat dissociable cross-linking points are formed inside of a cured film, so that surface hardness is considered to be enhanced.

The acidic groups, basic groups, or the precursors thereof that are included in the specific polymer are introduced as a monomer unit. The amount thereof is, from the viewpoint of solubility and ejection stability, preferably from 0.1 mol % to 40 mol %, more preferably from 1 mol % to 30 mol %, and still more preferably from 1 mol % to 20 mol %. Further, the number of the acidic group or basic group in the monomer unit is preferably from 1 to 4, more preferably 1 to 2, and still more preferably 1 (one).

In addition, as a method of introducing the acidic groups or basic groups into the specific polymer of the present invention, the methods described above are used preferably, but these are not limitative as long as two or more acidic groups or basic groups are introduced into the specific polymer.

The specific polymer may include therein the other structure in addition to the above described acidic groups or basic groups. At least one partial structure selected from the group consisting of (i) a fluoro-substituted hydrocarbon group, (ii) a siloxane structure, and (iii) a long chain alkyl group is preferably included in the specific polymer.

(i) Fluorine-Substituted Hydrocarbon Group

The fluoro-substituted hydrocarbon group (i) that may be included in the specific polymer used in the present invention is a hydrocarbon group that is substituted with at least one fluorine atom, including a fluorine-substituted alkyl group in which at least one hydrogen atom of the alkyl group is replaced with a fluorine atom. A perfluoroalkyl group in which all of the hydrogen atoms of the alkyl group are replaced with fluorine atoms is preferred.

The alkyl group has preferably from 3 to 12 carbon atoms, more preferably from 4 to 10 carbon atoms, and still more preferably from 6 to 8 carbon atoms.

The fluorine-substituted hydrocarbon group may be included in the specific polymer, and may be bonded thereto through a polyoxyalkylene group.

Considering segregation to ink surface, the fluorine-substituted hydrocarbon group of the specific polymer according to the present invention is preferably a group represented by the following formula I.

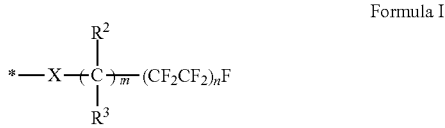

Formula I

In Formula I, each of $R^2$ and $R^3$ represents a hydrogen atom or an alkyl group having from 1 to 4 carbon atoms; "*" represents a linking site at a polymer chain; X represents a single bond or a divalent linking group; m represents an integer of 0 or more; and n represents an integer of 1 or more.

In addition, when m is 2 or more, functional groups bonded to carbon atoms adjacent to each other (namely, $R^2$ and $R^2$ or $R^3$ and $R^3$ that are bonded to carbon atoms adjacent to each other) may bind with each other to form an aliphatic ring.

In addition, among the substituent groups that are represented by Formula (I), the substituent group tin which n in Formula I is in the range of from 1 to 10 is preferable. More preferably, n is in the range of from 1 to 4. Still more preferably, n is 2 or 3.

In Formula I, m represents an integer from 0, preferably from 2 to 8, and more preferably 2.

Further, the linking site to the polymer chain represented by * may connects directly to the main chain of the specific polymer or connects through a divalent linking group such as a polyoxyalkylene group, an alkylene group, an ester group, an urethane group, a cyclic alkylene group that may have a hetero atom therein, poly(caprolactone), or an amino group. Connection through a polyoxyalkylene group is preferable.

Examples of the alkyl group having from 1 to 4 carbon atoms that is represented by $R^2$ and $R^3$ in Formula I include a methyl group; an ethyl group; a propyl group; an isopropyl group; an n-butyl group; an isobutyl group; and a tert-butyl group. Each of $R^2$ and $R^3$ is preferably a hydrogen atom or a methyl group, and more preferably a hydrogen atom.

In Formula I, when X is a single bond, this means that the polymer main chain directly links to the carbon atom to which each of $R^2$ and $R^3$ bond.

When X is a divalent linking group, examples of the linking group include —O—, —S—, —N($R^4$)—, and —CO—. Among these, —O— is more preferable. As used herein, $R^4$ represents a hydrogen atom or an alkyl group having from 1 to 4 carbon atoms. Examples of the alkyl group include a methyl group; an ethyl group; a propyl group; an isopropyl group; an n-butyl group; an isobutyl group; and a tert-butyl group. $R^4$ is preferably a hydrogen atom or a methyl group.

The fluorine-substituted hydrocarbon group may be easily introduced into a terminal or a side chain of the specific polymer by using the following compounds. In addition, the fluorine-substituted hydrocarbon group may be also introduced into the specific polymer through a polyoxyalkylene group.

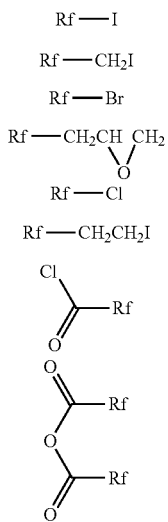

Rf represents a group that is represented by the following formula. In the following formula, T represents one kind of group that is selected from the following T-group; and n2 represents an integer from 0 to 6.

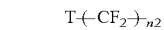

T-Group

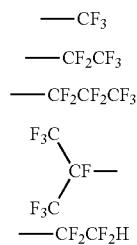

Further, by using a monomer having a fluorine-substituted hydrocarbon group (hereinafter, referred to as a fluorine-substituted hydrocarbon group-containing monomer), the fluorine-substituted hydrocarbon group may be also introduced into the specific polymer.

A preferred example of the fluorine-substituted hydrocarbon-containing monomer may include a monomer represented by the following Formula II.

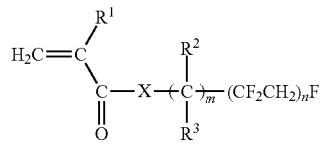

Formula II

In Formula II, $R^1$ represents a hydrogen atom, a halogen atom, a methyl group that may have a substituent group, or an ethyl group that may has a substituent group. $R^2$, $R^3$, X, m, and n have the same definitions as $R^2$, $R^3$, X, m, and n in Formula I, respectively. Preferred examples thereof are also the same as those of $R^2$, $R^3$, X, m, and n.

In addition, examples of the halogen atom represented by $R^1$ in Formula II include a fluorine atom, a chlorine atom, and a bromine atom.

As the fluoro-substituted hydrocarbon containing monomer, among the monomers represented by the above Formula II, a monomer on which n in Formula II is from 1 to 10 is preferable. More preferably, n is from 1 to 4. Still more preferably, n is 2 or 3.

Examples of an alkyl group having from 1 to 4 carbon atoms, that is represented by each of $R^2$ and $R^3$ in Formula II include a methyl group; an ethyl group; a propyl group; an isopropyl group; an n-butyl group; an isobutyl group; and a tert-butyl group. Each of $R^2$ and $R^3$ is preferably a hydrogen atom or a methyl group and more preferably a hydrogen atom.

In Formula II, when X is a single bond, the polymer main chain directly links to the carbon atom to which each of $R^2$ and $R^3$ is bonded.

Further, when X is a divalent linking group, the linking group is —O—, —S—, —N($R^4$)—, —CO—, or the like. Among these, —O— is more preferable.

As used herein, $R^4$ represents a hydrogen atom or an alkyl group having from 1 to 4 carbon atoms. Examples of the alkyl group include a methyl group; an ethyl group; a propyl group; an isopropyl group; an n-butyl group; an isobutyl group; and a tert-butyl group. $R^4$ is preferably a hydrogen atom or a methyl group.

In Formula II, m represents an integer equal to or larger than 0 (zero), preferably an integer from 2 to 8, and more preferably 2. When m is 2 or more, functional groups bonded to carbon atoms adjacent to each other (namely, $R^2$ and $R^2$, or $R^3$ and $R^3$ are bonded to carbon atoms adjacent to each other) may bind with each other to form an aliphatic ring.

In Formula II, n represents an integer from 1, preferably an integer from 1 to 10, more preferably from 1 to 4, and still more preferably 2 or 3.

The specific polymer used in the present invention may be easily prepared by a method known to those skilled in the art, for instance, a method of introducing a compound having the fluorine-substituted hydrocarbon group into a terminal of a polyoxyalkylene group; and a method of performing polycondensation, addition polymerization, or open-ring polymerization of a monomer having a substitution group represented by Formula I (that is, a monomer having a fluorine-substituted hydrocarbon group). When needed, these methods may be used in combination.

Further, a method of producing a compound that includes therein the fluorine-substituted hydrocarbon group is described in, for instance, the "Fusso Kagobutsu No Gosei To Kino" (Synthesis and Functions of Fluorine compounds) (ed. by Nobuo Ishikawa, CMC Publishing Co., Ltd., 1987) p. 117 to 118 or the "Chemistry of Organic Fluorine Compounds II" (Monograph 187, ed. by Milos Hudlicky and Attila E. Pavlath, American Chemical Society, 1995) p. 747 to 752.

Specific examples of the monomer represented by Formula II, used in the present invention, include compounds described in the paragraphs [0058] to [0061] of JP-A No. 2010-18728. Among these, a structure in which a fluorine-substituted hydrocarbon group is bonded to a polyalkylene group is preferable.

Siloxane Structure

The siloxane structure that may be included in the specific polymer is not particularly limited as long as the structure includes therein a "—Si—O—Si—" group. Preferably, the structure includes a polyoxyalkylene group.

By including the siloxane structure, ejection stability of the ink composition may be enhanced and surface segregation caused in the time when an ink composition is coated to form a film may be increased. Considering this, it is preferable that the siloxane structure is introduced into the specific polymer by polymerizing a compound (hereinafter, also referred to as "specific siloxane compound") that is represented by the following structural Formula (A).

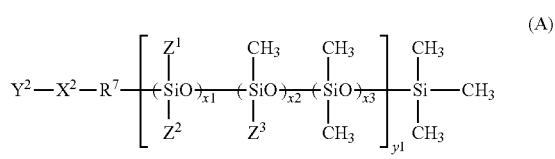

In structural Formula (A), $R^7$ represents a straight-chain or branched alkylene group that has from 2 to 6 carbon atoms and may have a substituent group such as a hydroxyl group, an amine group or a halogen atom; or a divalent linking group represented by the following structural Formula (B).

$$-(-CH_2CH_2O-)_{n1}-(-CH_2CHO-)_{n2}-(-C_4H_8O-)_{n3}-CH_2CH- \atop \qquad\qquad\qquad\quad | \qquad\qquad\qquad\qquad | \atop \qquad\qquad\qquad\quad CH_3 \qquad\qquad\qquad\qquad R^4$$ (B)

In the above structural Formula (B), $R^4$ represents a hydrogen atom, a methyl group, or an ethyl group. Each of n1, n2, and n3 independently represents an integer from 0 to 100. As used herein, two or more $R^4$s are included in structural Formula (B), but each of $R^4$s may be the same or different from each other.

In structural Formula (A), x1, x2, and x3 represent integers whose total is from 1 to 100.

Further, y1 represents an integer from 1 to 30.

In structural Formula (A), $X^2$ represents a single bond or a divalent group represented by the following structural Formula (C).

$$-R^8-Q^1-\overset{\overset{\displaystyle O}{\|}}{C}-Q^2-$$ (C)

In structural Formula (C), $R^8$ represents a straight-chain or branched alkylene group that has from 1 to 6 carbon atoms and may have a substituent group such as a hydroxyl group, an amine group, or a halogen atom; each of $Q^1$ and $Q^2$ independently represents an oxygen atom, a sulfur atom, or $-NR^B-$; and $Q^1$ and $Q^2$ may be the same or different from each other. $R^B$ represents a hydrogen atom or an alkyl group having from 1 to 4 carbon atoms.

In structural Formula (C), $Q^2$ bonds to $R^7$ of structural Formula (A).

In structural Formula (A), $Y^2$ represents a monovalent group represented by the following structural Formulae (D) to (F).

$$-O-\underset{\underset{\displaystyle O}{\|}}{C}-\underset{\underset{\displaystyle R^5}{|}}{C}=CH_2$$ (D)

$$-O-CH_2-\underset{\underset{\displaystyle R^5}{|}}{C}=CH_2$$ (E)

$$-O-\underset{\underset{\displaystyle H}{|}}{C}=CH_2$$ (F)

In structural Formulae (D) to (F), $R^5$ represents a hydrogen atom or a straight-chain or branched alkyl group having from 1 to 6 carbon atoms.

In structural Formula (A), each of $Z^1$, $Z^2$, and $Z^3$ independently represents a monovalent group represented by the following structural Formula (G).

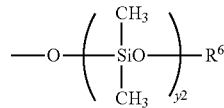

(G)

In the above structural formula (G), $R^6$ represents a non-substituted alkyl group having from 1 to 4 carbon atoms; and $y^2$ represents an integer from 1 to 100, preferably from 1 to 50, and more preferably from 1 to 20.

Further, as the siloxane structure, the structures that are described in the paragraphs [0092] to [0094] of JP-A No. 2010-18728 and are the specific examples of the above Formula (A) may be used, but these are not limitative.

Among these, a siloxane structure that is bonded to the polymer through a polyoxyalkylene group is preferable.

Long-Chain Alkyl Group

A long-chain alkyl group that may be included in the specific polymer is an alkyl group having from 4 to 12 carbon atoms and is preferably represented by the following Formula (3). It is also preferable that the long-chain alkyl group is introduced into the specific polymer through a polyoxyalkylene group.

(3)

In Formula (3), A represents a single bond, or a divalent to tetravalent hydrocarbon having from 1 to 12 carbon atoms derived from a cyclic, straight-chain, or branched alkyl group or a phenyl group; $R^{11}$ represents an alkyl group (for example, a straight-chain or branched alkyl group) having from 6 to 20 carbon atoms; and n3 represents an integer from 1 to 3.

The long-chain alkyl group may be introduced into the polymer in a manner that the group is linked to the polymer main chain, but the group is preferably linked to an terminal of a polyoxyalkylene group.

In the above Formula (3), $R^{11}$ is an alkyl group having from 6 to 20 carbon atoms, and preferably from 10 to 20 carbon atoms and n3 is an integer from 1 to 3. When both $R^{11}$ and n3 are within the above ranges, favorable surface segregation may be attained.

Introduction of these groups into the specific polymer may be performed by a method of copolymerizing a vinyl compound including therein these groups and a polymerizable compound including therein an unsaturated group such as a (meth)acryloyl compound.

Examples of a structural unit that composes the long-chain alkyl group include the structural unit described in the paragraphs [0096] to [0097] of JP-A No. 2010-18728.

Further, a structure having the long-chain alkyl group that is linked to the polymer through a polyoxyalkylene group is preferable. This structure is described in the section of Formula (1) below.

The specific polymer (A) used in the present invention has two or more acidic groups or basic groups. A preferred specific polymer (A) has, on a side chain thereof, an polyoxyalkylene group represented by the following Formula (1) and has, at a terminal of the polyoxyalkylene group, a partial structure selected from the group consisting of a fluorine-substituted hydrocarbon group, a siloxane structure, and a long-chain alkyl group.

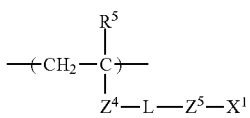

(1)

In Formula (1), $R^5$ represents a hydrogen atom or a methyl group; each of $Z^4$ and $Z^5$ represents an divalent organic group; L represents a polyoxyalkylene group; and $X^1$ represents a group selected from the group consisting of a fluoro alkyl group, a siloxane structure, and a long-chain alkyl group.

In Formula (1), each of $Z^4$ and $Z^5$ independently represents a straight-chain or branched alkylene group having from 1 to 20 carbon atoms; a cyclic alkylene group; a straight-chain or branched alkenyl group having from 2 to 20 carbon atoms; a cyclic alkenyl group; an alkynyl group having from 2 to 20 carbon atoms; an arylene (single ring or heterocyclic) group having from 6 to 20 carbon atoms; —OC(=O)—; —OC(=O)Ar—; —OC(=O)O—; —OC(=O)OAr—; —C(=O)NR—; —C(=O)NAr—; —SO$_2$NR—; —SO$_2$NAr—; —OAr— (aryleneoxy or polyaryleneoxy); —C(=O)O—; —C(=O)O—Ar—; —C(=O)Ar—; —C(=O)—; —SO$_2$O—; —SO$_2$OAr—; —OSO$_2$—; —OSO$_2$Ar—; —NRSO$_2$—; —NArSO$_2$—; —NRC(=O)—; —NArC(=O)—; —NRC(=O)O—; —NArC(=O)O—; —OC(=O)NR—; —OC(=O)NAr—; —NAr—; —NR—; —N$^+$RR'—; —N$^+$RAr—; —N$^+$ArAr'—; —S—; —SAr—; —ArS—; a heterocyclic group (3 to 12 membered single or condensed ring that contains at least one hetero atom such as nitrogen, oxygen, or sulfur); —OC(=S)—; —OC(=S)Ar—; —C(=S)O—; —C(=S)OAr—; —C(=S)OAr—; —C(=O)S—; —C(=O)SAr—; —ArC(=O)—; —ArC(=O)NR—; —ArC(=O)NAr—; —ArC(=O)O—; —ArC(=O)S—; —ArC(=S)O—; —ArO—; —ArNR—; or the like.

As used herein, each of R and R' independently represents a hydrogen atom, a straight-chain or branched alkyl group, a cyclic alkyl group, a straight-chain or branched alkenyl group, a cyclic alkenyl group, a straight-chain or branched alkynyl group, or a cyclic alkynyl group. Each of Ar and Ar' independently represents an aryl group.

Among there linking groups, it is preferred that each of $Z^4$ and $Z^5$ independently represents an arylene (single ring or heterocyclic) group having from 6 to 20 carbon atoms; —C(=O)NR—; —C(=O)NAr—; —O—(including alkyleneoxy and polyalkyleneoxy); —OAr— (aryleneoxy or polyaryleneoxy); —C(=O)O—; —C(=O)O—Ar—; —C(=O)—; —C(=O)Ar—; —S—; —SAr—; —ArS—; —ArC(=O)—; —ArC(=O)O—; —ArO—; —ArNR—; —C(=O)—; or the like, and more preferably an arylene (single ring or heterocyclic) group having from 6 to 20 carbon atoms; —C(=O)NR—; —C(=O)NAr—; —OAr— (aryleneoxy or polyaryleneoxy); —C(=O)O—; —C(=O)O—Ar—; —SAr—; —ArS—; —ArC(=O)—; —ArC(=O)O—; —ArO—; —ArNR—; —C(=O)—; or the like.

In the present invention, the above linking group represented by $Z^4$ or $Z^5$ may be a combination of two or more kinds of groups described above.

L represents a polyoxyalkylene group that is represented by the following Formula (2). Each of m1, m2 and m3 independently represents an integer from 0 or 100. Preferably, each of m1, m2, and m3 is in the range of from 0 to 20. Within this range, favorable image smoothness and sensitivity may be attained.

A molecular weight of the whole polyoxyalkylene group is preferably from 150 to 5,000, more preferably from 200 to 5,000, and still more preferably from 300 to 3,000. Within this molecular weight range, favorable image smoothness may be attained.

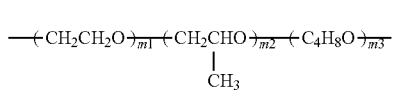

(2)

Specific examples of the structural unit represented by Formula (1) are described below, but the present invention is in no way limited to the following structural units. Further, two or more kinds of the following structural units may be used in combination.

As for a preferable embodiment, the specific polymer used in the present invention may be produced by copolymerizing a monomer having the structural unit represented by formula (1) with a monomer having other structural unit(s).

Specific examples of a structure in which a fluorine-substituted hydrocarbon group is linked to the polymer through a polyoxyalkylene group include the following structures.

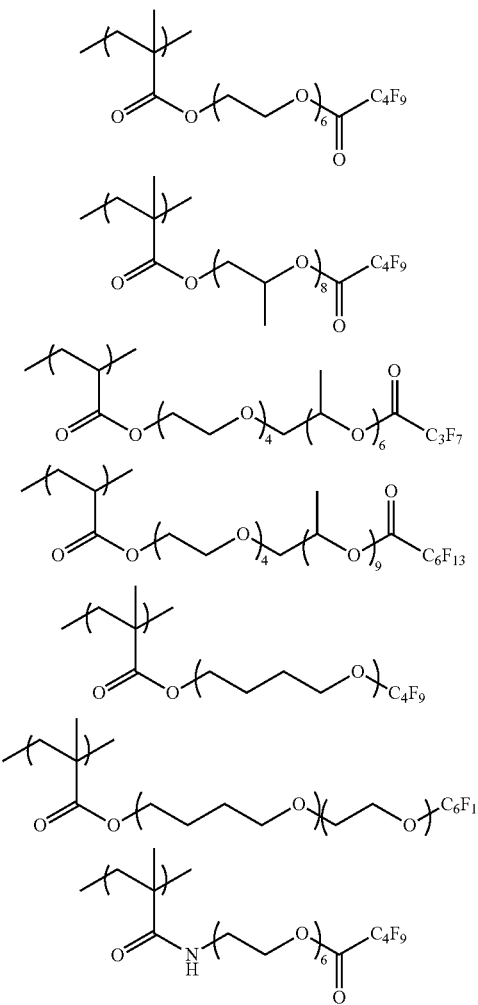

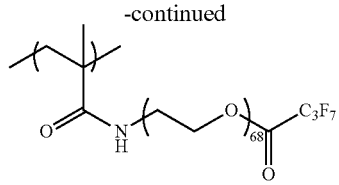

-continued

Further, specific examples of a structure in which a siloxane structure is linked to the polymer through a polyoxyalkylene group include the following structures. In the following formula, R represents a divalent linking group.

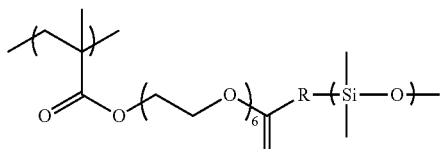
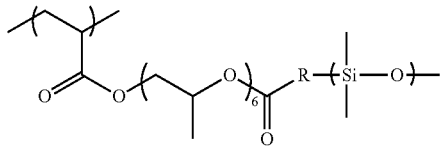
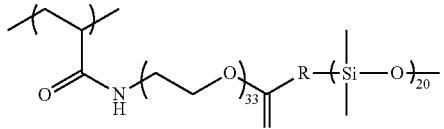
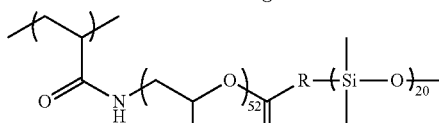
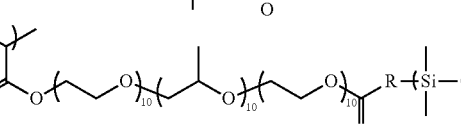
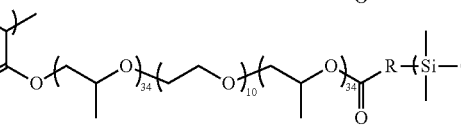
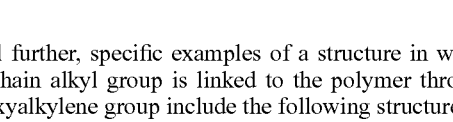

Still further, specific examples of a structure in which a long-chain alkyl group is linked to the polymer through a polyoxyalkylene group include the following structures.

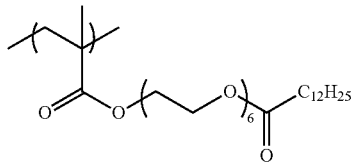
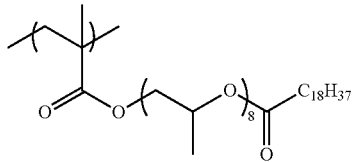

A total content of the partial structure(s) that is (or are) included in the specific polymer and that is (or are) selected from the group consisting of a fluorine-substituted hydrocarbon group, a siloxane structure, and a long-chain alkyl group is preferably from 1% by mass to 40% by mass, more preferably from 1.5% by mass to 30% by mass, and still more preferably from 2% by mass to 20% by mass, with respect to the mass of the specific polymer.

Within the above ranges, surface segregation of the specific polymer in the ink composition may be efficiently performed and smoothness may be improved.

For the specific polymer, in addition to the above-described respective components, conventional polymerizable monomers, diisocyanates, diols, or diamines may be used as the other components, for the purpose of conditioning solubility or glass transition temperature or for the other purposes.

Specific embodiments of the main chain of the specific polymer may include the following examples.

For instance, acrylic resin, methacrylic resin, styryl resin, polyester resin, polyurethane resin, polycarbonate resin, polyamide resin, polyacetal resin, phenol/formaldehyde condensation resin, polyvinylphenol resin, maleic anhydride and α-olefin resin, α-hetero substituted methacrylic resin, and the like may be used. Among these, acrylic resin, methacrylic resin, styryl resin, polyester resin, and polyurethane resin are useful. Particularly, acrylic resin, methacrylic resin, and polyurethane resin are useful.

Specific exemplified compounds (A-1) to (A-37) of the specific polymer favorably used in the present invention are described below. However, the present invention is in no way limited to these exemplified compounds.

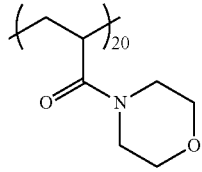
Mw = 12000
(A-8)
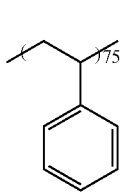
Mw = 25000
(A-9)
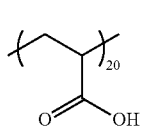
Mw = 46000
(A-10)
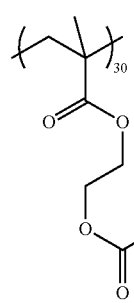
Mw = 20000
(A-11)
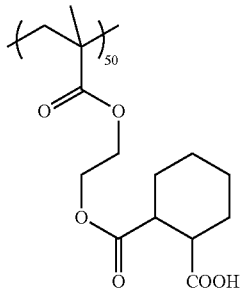
Mw = 18000
(A-12)
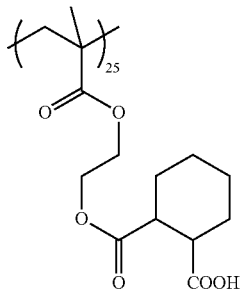
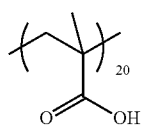
Mw = 32000
(A-13)
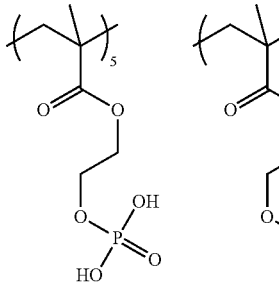
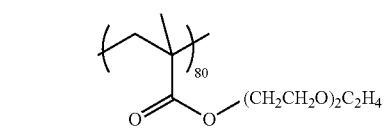
Mw = 60000
(A-14)
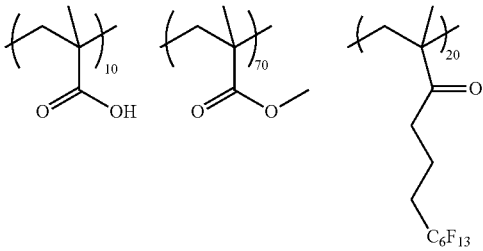
Mw = 2500
(A-15)
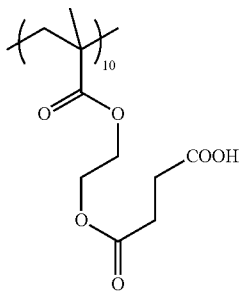
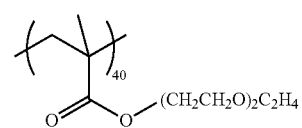
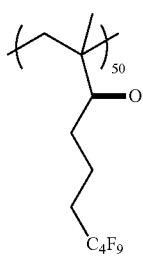
(A-15)
Mw = 18000

(A-16)
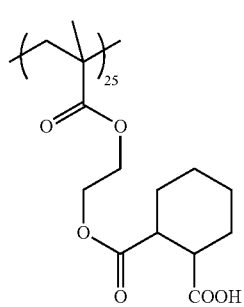
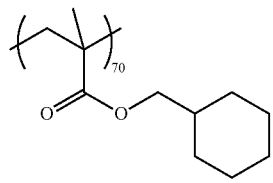
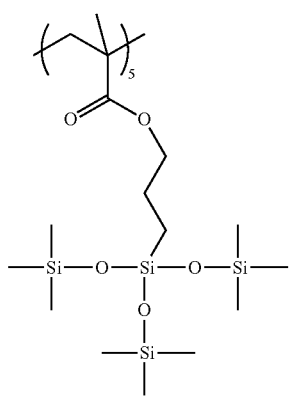
(A-16)
Mw = 28000
(A-17)
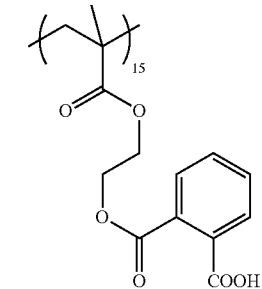
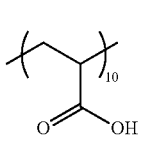
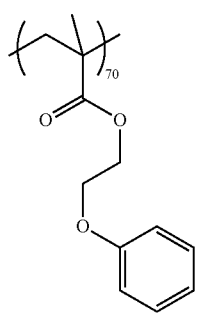
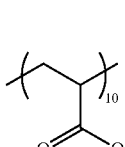
Mw = 42000
(A-18)
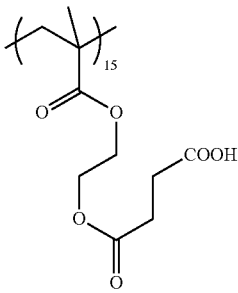
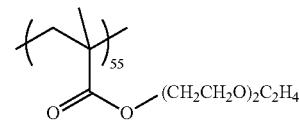
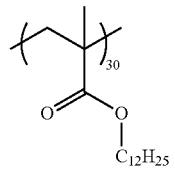
Mw = 80000
(A-19)
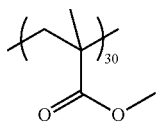
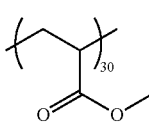
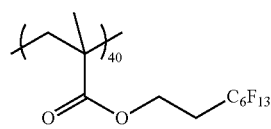
Mw = 12000
(A-20)
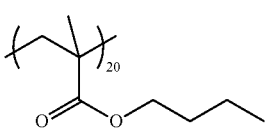
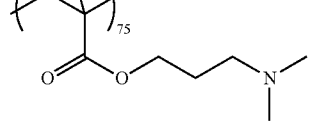
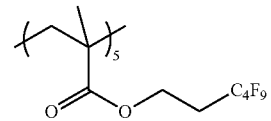
Mw = 26000
(A-21)
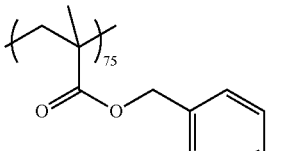
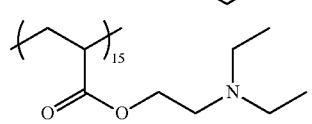

-continued
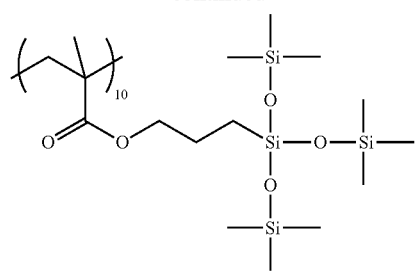
Mw = 47000
(A-22)
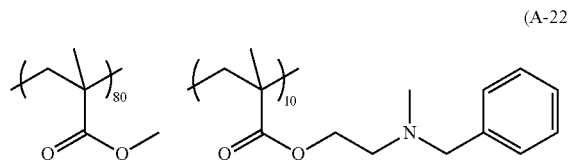
Mw = 35000
(A-23)
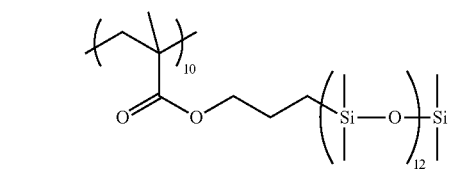
Mw = 52000
(A-24)
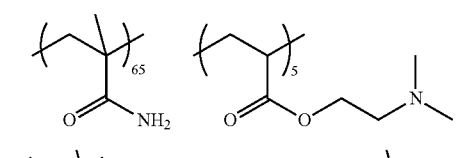
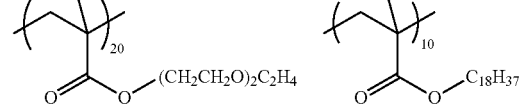
Mw = 33000
(A-25)
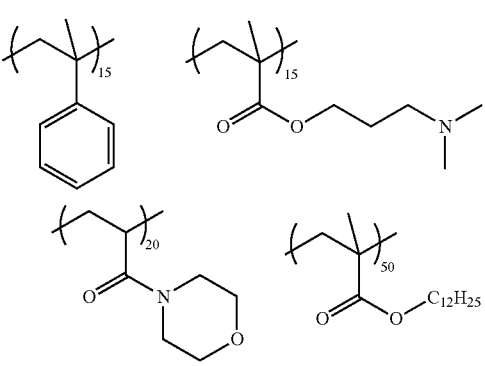
-continued
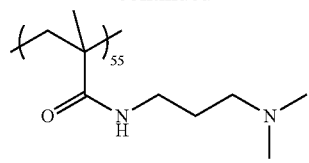
Mw = 15000
(A-26)
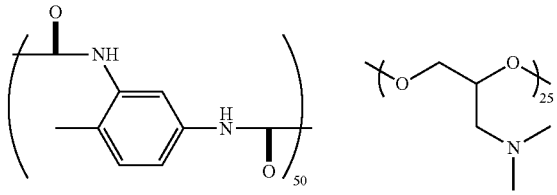
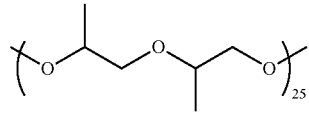
Mw = 35000
(A-27)
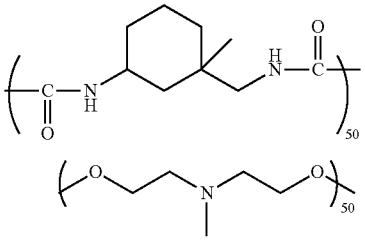
Mw = 32000
(A-28)
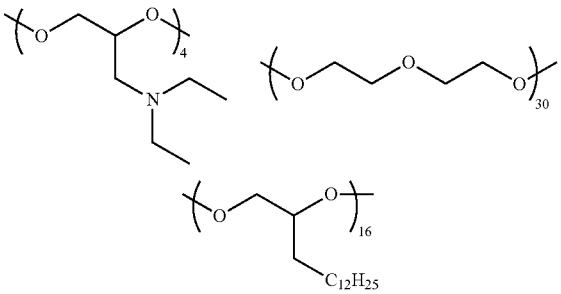
Mw = 13000
(A-29)
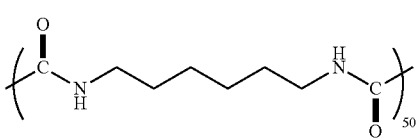

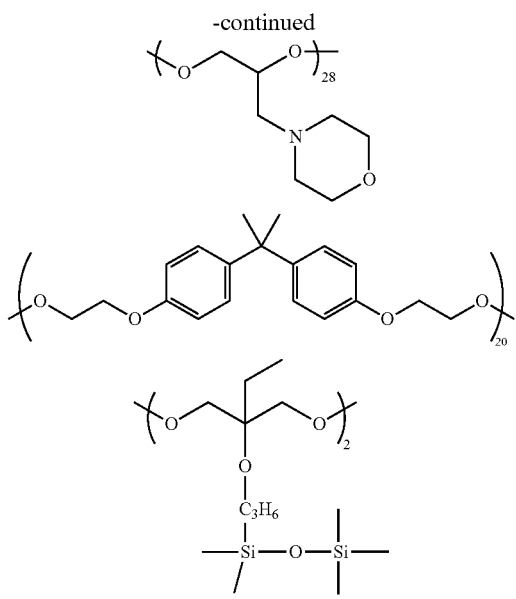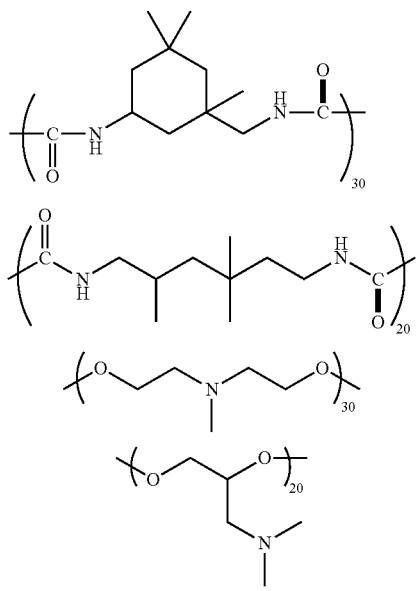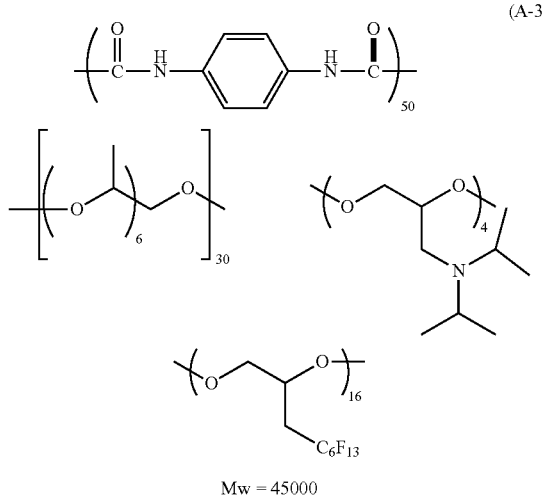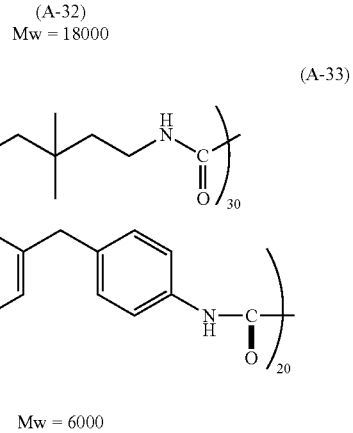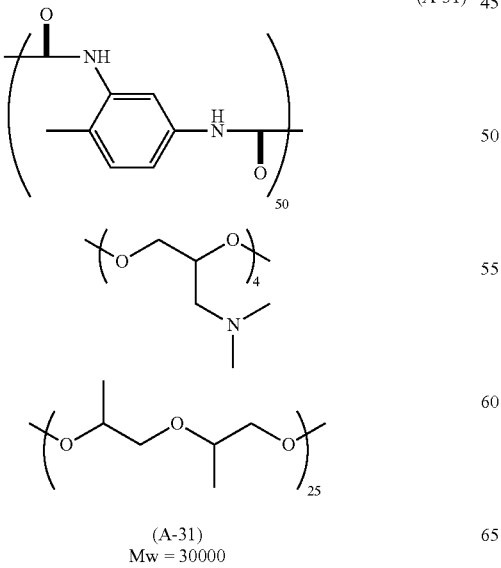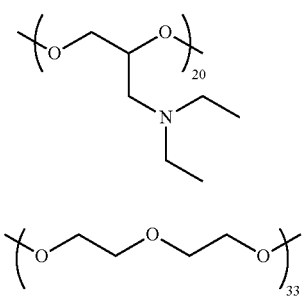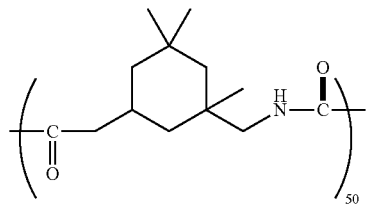

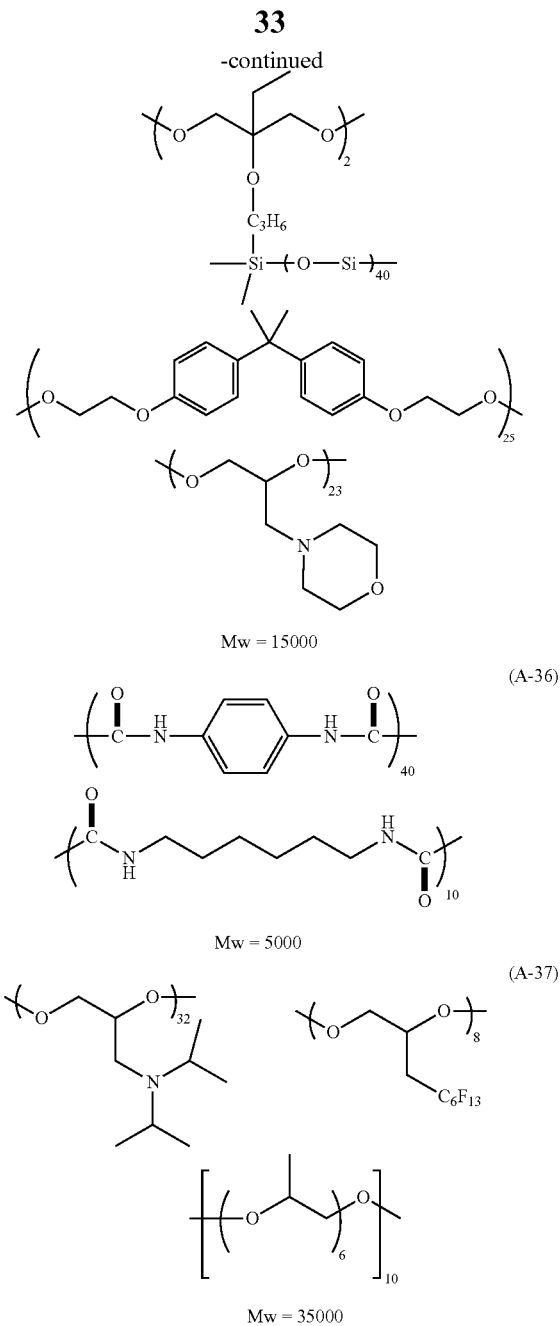

From the viewpoint of ink-jet ejection stability and viscosity, the molecular weight of the specific polymer is preferably from 2,500 to 100,000, more preferably from 5,000 to 80,000, and still more preferably from 10,000 to 60,000, in terms of weight average molecular weight.

A content of the specific polymer in the active radiation curable ink composition of the present invention is preferably from 0.1% to 10%, more preferably from 0.5% to 8%, and still more preferably from 1% to 5%, in terms of mass. Within these ranges, film properties of the cured ink composition may become favorable. As a result, sufficient hardness may be attained so that advantages of the present invention are achieved.

Polymerizable Monomer (B) Having a Substituent Group Capable of Forming a Salt as a Counter Member of the Acidic Groups or Basic Groups of the Above-Described Polymer (A): Specific Monomer (B)

The ink composition of the present invention includes therein a polymerizable monomer (B) (specific monomer) having a substituent group capable of forming a counter salt with the acidic groups or the basic groups of the polymer (A).

Namely, when the specific polymer has two or more acidic groups, a polymerizable monomer having a basic group that forms a counter salt with the acidic groups is used. When the specific polymer has two or more basic groups, a polymerizable monomer having an acidic group that forms a counter salt with the basic groups is used.

The polymerizable monomer having a basic group and the polymerizable monomer having an acidic group are described below.

As the polymerizable monomer having a basic group, any polymerizable monomer may be favorably used as long as the monomer has a basic group capable of forming a counter salt with the specific polymer having acidic groups. Considering interaction with carboxyl groups or other acidic groups of the specific polymer and availability, a radically polymerizable monomer having a functional group containing a basic nitrogen atom is preferable. Considering stability of the ink composition and others, a polymerizable monomer having an aliphatic amino group or an aromatic amino group is more preferable. A polymerizable monomer having an aliphatic amino group is preferable in particular.

More specifically, (meth)acrylate, (meth)acrylamide, styrene, and a N-vinyl compound that have a secondary or tertiary aliphatic amine structure having from 5 to 20 carbon atoms are preferable.

As the polymerizable monomer having an acidic group, any polymerizable monomer may be favorably used as long as the monomer has an acidic group having a dissociative proton with a pKa of less than 11. Considering interaction with amino groups or other basic groups of the specific polymer and availability, a polymerizable monomer having an acidic group such as a carboxyl group, a sulfonic acid group, a phenolic hydroxyl group, a phosphoric acid group, a phosphonic acid group, an aminosulfonyl group, an acetylacetonate group, or an active imide group as described in JP-A No. 2005-107112 is preferable. Considering liquid properties or curing properties of the ink composition or flexibility after curing, a polymerizable monomer having a carboxyl group, a sulfonic acid group, a phosphoric acid group or the like is more preferable. A polymerizable monomer having a carboxyl group is particularly preferable.

More specifically, (meth)acrylate, (meth)acrylamide, styrene, and a N-vinyl compound, each of which has a carboxylic acid structure having from 5 to 20 carbon atoms, are preferable.

These polymerizable monomers are described below, but the present invention is in no way limited to these polymerizable monomers. Here, (Bb-1) to (Bb-14) are polymerizable monomers having a basic group, and (Ba-1) to (Ba-18) are polymerizable monomers having an acidic group.

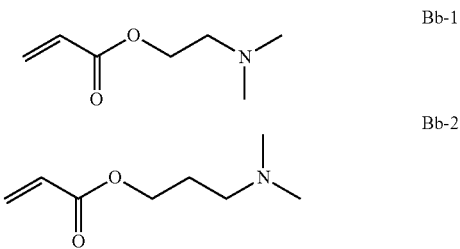

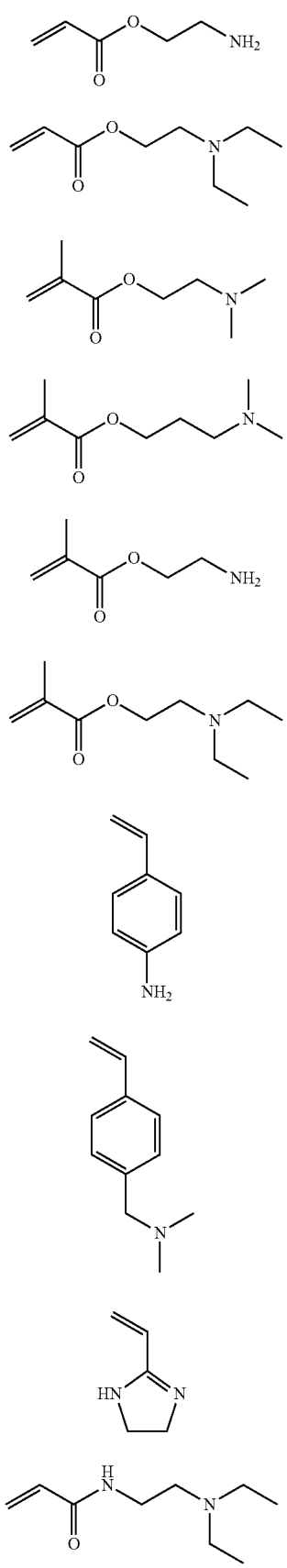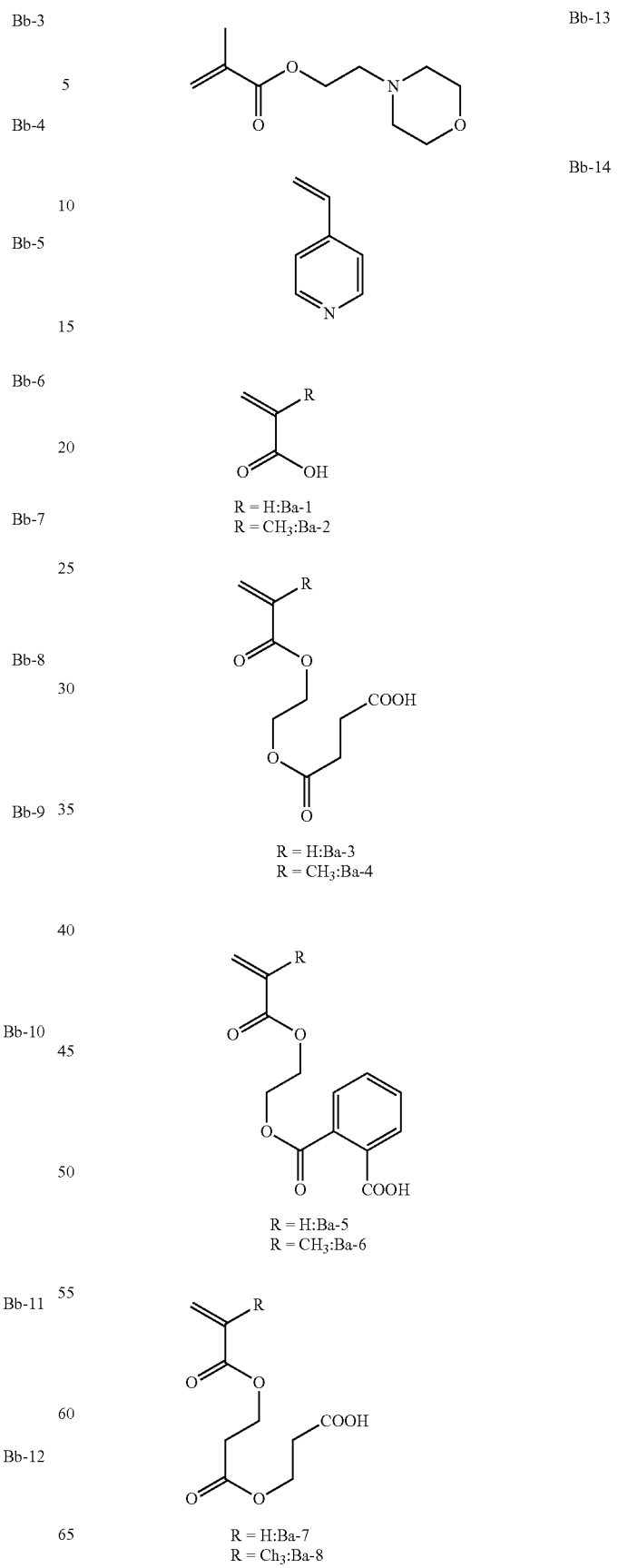

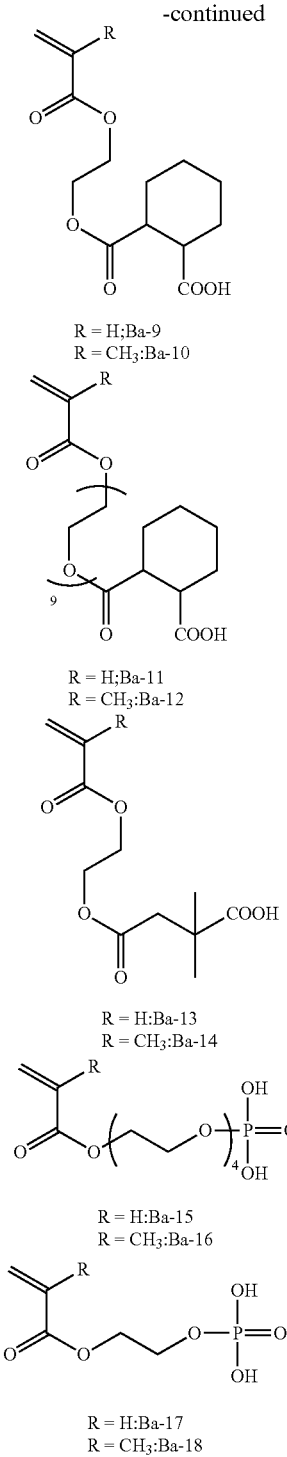

R = H;Ba-9
R = CH₃;Ba-10

R = H;Ba-11
R = CH₃;Ba-12

R = H;Ba-13
R = CH₃;Ba-14

R = H;Ba-15
R = CH₃;Ba-16

R = H;Ba-17
R = CH₃;Ba-18

A weight average molecular weight of the polymerizable monomer having an acidic or basic group is preferably from 70 to 500 and more preferably from 100 to 400.

A relation between the acidic or basic groups that the specific polymer includes therein and the basic or acidic group that the polymerizable monomer includes therein is described below.

When a specific polymer having acidic groups is used, a polymerizable monomer having a basic group is used. The acidic groups of the specific polymer and the basic group of the polymerizable monomer have a relation exhibiting a difference of preferably from 1 to 15, more preferably from 2 to 12, and still more preferably from 3 to 10 in pKa between the acidic groups and a protonated basic group.

A relation that exists in a case in which a specific polymer having basic groups is used is the same as that described above.

Examples of a preferable combination of functional groups, namely, a combination of the acidic groups of the specific polymer and the basic group of the polymerizable monomer or a combination of the basic groups of the specific polymer and the acidic group of the polymerizable monomer include a combination of a dimethylamino group and a carboxylic acid group; a combination of a diethylamino group and a carboxylic acid group; a combination of an N-methylpiperidine group and a carboxylic acid group; a combination of a methylbenzylamino group and a carboxylic acid group; a combination of a diisopropylamino group and a carboxylic acid group; a combination of a dicyclohexylamino group and a carboxylic acid; a combination of a morpholino group and a carboxylic acid group; a combination of a tert-butylamino group and a carboxylic acid group; a combination of a dimethylamino group and a phosphonic acid group; a combination of a diethylamino group and a phosphonic acid group; and a combination of a pyridine group and a carboxylic acid group. Examples of a more preferable combination include a combination of a dimethylamino group and a carboxylic acid group; a combination of a diethylamino group and a carboxylic acid group; and a combination of an N-methylpiperidine group and a carboxylic acid group.

In the ink composition of the present invention, it is preferable that the amount of the acidic or basic groups of the specific polymer (A) is larger, in terms of equivalence, than the amount of the substituent group of the polymerizable monomer (B) capable of forming a counter salt. Further, a content of the polymerizable monomer having a basic group or the polymerizable monomer having an acidic group is preferably from 0.2 to 1, and more preferably from 0.4 to 1, in terms of equivalence, with respect to the acidic or basic groups of the specific polymer (A). Within these ranges, advantages of the present invention may be fully achieved.

Photopolymerization Initiator (C)

The ink composition of the invention contains the photopolymerization initiator (C).

As the photopolymerization initiator (C), known photopolymerization initiators can be appropriately selected to use them according to intended uses of the ink composition.

The photopolymerization initiator used in the ink composition of the invention is a compound that absorbs external energy (light) to generate a radical which is a polymerization initiation species. Examples of the light include active radiation, i.e., γ-rays, β-rays, electron beams, ultraviolet rays, visible rays, and infrared rays.

Any of known compounds may be used as the additional photopolymerization initiator. Examples of photopolymerization initiators that are preferably used in the invention include: (a) aromatic ketones; (b) acyl phosphine oxide compounds; (c) aromatic onium salt compounds; (d) organic peroxides; (e) thio compounds; (f) hexaaryl biimidazole compounds; (g) ketooxime ester compounds; (h) borate compounds; (i) azinium compounds; (j) metallocene compounds; (k) active ester compounds; (l) compounds having a carbon-halogen bond; and (m) alkylamine compounds.

As the photopolymerization initiators, the above compounds of (a) to (m) may be used singly or in combination.

The photopolymerization initiator in the invention is preferably used singly or in combination of two or more kinds thereof.

Preferable examples of the (a) aromatic ketones, the (b) acylphosphine compounds, and the (e) thio compounds include compounds having a benzophenone skeleton or a thioxanthone skeleton described in "RADIATION CURING IN POLYMER SCIENCE AND TECHNOLOGY" J. P. FOUASSIER, J. F. RABEK (1993), pp. 77 to 117. Examples of more preferable one include an α-thiobenzophenone compound described in JP-B No. 47-6416, a benzoin ether compound described in JP-B No. 47-3981, an α-substituted benzoin compound described in JP-B No. 47-22326, a benzoin derivative described in JP-B No. 47-23664, aroylphosphonic acid ester described in JP-A No. 57-30704, dialkoxybenzophenone described in JP-B No. 60-26483, benzoin ethers described in JP-B No. 60-26403 and JP-A No. 62-81345, α-aminobenzophenones described in JP-B No. 1-34242, U.S. Pat. No. 4,318,791, and EP Patent No. 0284561A1, p-di(dimethylamino benzoyl)benzene described in JP-A No. 2-211452, thio-substituted aromatic ketones described in JP-A No. 61-194062, acylphosphine sulfide described in JP-B No. 2-9597, acylphosphine described in JP-B No. 2-9596, thioxanthones described in JP-B No. 63-61950, and coumarin compounds described in JP-B No. 59-42864.

In addition to the above, polymerization initiators described in JP-A Nos. 2008-105379 and 2009-114290 are also preferable.

Among the above, it is preferable to use an acylphosphine oxide compound as the photopolymerization initiator in the invention. Preferable examples include bis(2,4,6-trimethylbenzoyl)-phenyl phosphine oxide (IRGACURE 819: trade name, manufactured by Ciba Specialty Chemicals, Inc.), bis(2,6-dimethoxybenzoyl)-2,4,4-trimethylpentyl-phosphine oxide, and 2,4,6-trimethyl benzoyl-diphenyl phosphine oxide (DAROCUR TPO: trade name, manufactured by Ciba Specialty Chemicals, Inc., Lucirin TPO: trade name, manufactured by BASF A.G.).

The photopolymerization initiators can be used singly or in combination of two or more kinds thereof.

The content of the photopolymerization initiator in the ink composition is preferably from 0.1 to 20% by mass, more preferably from 0.5 to 15% by mass, and still more preferably from 1 to 10% by mass relative to the ink composition.

Polymerizable Monomer (D) Having a Different Structure from Polymerizable Monomer (B): Polymerizable Monomer D The ink composition of the present invention includes therein a polymerizable monomer (D) that has a different structure from the polymerizable monomer (B).

The polymerizable monomer D used in the present invention is a polymerizable monomer compound that has a different structure from the specific monomer (B).

As the polymerizable monomer D usable in the present invention, any polymerizable compound that has a radically polymerizable ethylenic unsaturated bond and any cationically-polymerizable compound are usable as long as these compounds have a different structure from the specific monomer (B). The polymerizable monomer D may have any of chemical forms such as a monomer, an oligomer, or a polymer thereof.

The polymerizable monomer D may be used singly or in a combination of two or more kinds thereof in an arbitrary ratio so as to improve objective properties. From the viewpoint of controlling performances such as reactivity or physical properties, two or more kinds of the polymerizable monomer D are preferably used in combination.

Examples of the polymerizable monomer D that has a radically polymerizable ethylenically-unsaturated bond include radically polymerizable compounds such as an anhydride having an ethylenically-unsaturated bond; acrylonitrile; styrene; various kinds of unsaturated polyester; an unsaturated polyether; an unsaturated polyamide; or an unsaturated urethane.

Specific examples of the polymerizable monomer D include an acrylic acid derivative such as 2-hydroxyethyl acrylate, butoxyethyl acrylate, carbitol acrylate, cyclohexyl acrylate, tetrahydrofurfuryl acrylate, benzyl acrylate, tridecyl acrylate, 2-phenoxyethyl acrylate, bis(4-acryloxypolyethoxyphenyl)propane, polyethyleneglycol diacrylate, polypropyleneglycol diacrylate, dipentaerythritol tetraacrylate, trimethylolpropane triacrylate, oligoester acrylate, N-methylol acrylamide, diacetone acrylamide, epoxy acrylate, isobornyl acrylate, dicyclopentenyl acrylate, dicyclopentenyloxyethyl acrylate, or dicyclopentanyl acrylate; a methacryl derivative such as methyl methacrylate, n-butyl methacrylate, allyl methacrylate, glycidyl methacrylate, benzyl methacrylate, dimethylaminomethyl methacrylate, polyethyleneglycol dimethacrylate, or polypropyleneglycol dimethacrylate, or 2,2-bis(4-methacryloxypolyethoxyphenyl)propane; and derivative of an allyl compound such as allylglycidyl ether, diallyl phthalate, or triallyl trimellitate. More specifically, the examples include commercially available products described in: the "Kakyozai Handbook", ed. by Shinzo Yamashita (published by Taiseisha Ltd., 1981); the "UV·EB Koka Handbook (Genryo Hen)", ed. by (published by Kobunshi Kanko Kai, 1985); the "UV·EB Koka Gijitsu No Oyo To Shijo", ed. by RadTech Japan (published by CMC Publishing Co., Ltd., 1989) p. 79; the "Polyester Jushi Handbook", ed. by Eiichiro Takiyama (published by The Nikkan Kyogyo Shimbun, Ltd., 1988), and others. Radically polymerizable or cross-linking monomers, oligomers, and polymers that are known in the art may be also used.

Among these acrylates and methacrylates, considering curing properties and film properties after curing, an acrylate of an alcohol having an ether oxygen atom such as tetrafurfuryl acrylate or 2-phenoxyethyl acrylate is preferable. Further, for the same reasons, an acrylate of an alcohol having an alicyclic structure is also preferable. Specific examples of preferable acrylates include isobornyl acrylate; dicyclopentenyl acrylate; dicyclopentenyloxyethyl acrylate; and dicyclopentanyl acrylate, which are an acrylate having a bicycle ring structure or a tricycle ring structure. Of these, dicyclopentenyl acrylate and dicyclopentenyloxyethyl acrylate that have a double bond in the alicyclic structure are particularly preferable.

In addition, as the polymerizable monomer D, photo-curable polymerizable compounds, which are used for the photopolymerizable compositions described in, for example, JP-A No. 7-159983, JP-B No. 7-31399, and JP-A Nos. 8-224982, 10-863, 9-134011 and Japanese Patent National phase Application Publication 2004-514014 are known. These polymerizable monomers may be also favorably used for the ink composition of the present invention.

The other examples of the polymerizable monomer D may include (meth)acrylic acid esters (hereinafter, appropriately referred to as acrylate compounds) of a (meth)acrylic monomer or prepolymer; an epoxy monomer or prepolymer; or an urethane monomer or prepolymer. Examples of these compounds include the follow compounds:

2-ethylhexyl-diglycol acrylate, 2-hydroxy-3-phenoxypropyl acrylate, 2-hydroxybutyl acrylate, hydroxypivalic acid neopentylglycol diacrylate, 2-acryloyloxyethyl phthalic acid, methoxy-polyethyleneglycol acrylate, tetramethylolmethane triacrylate, 2-acryloyloxyethyl-2-hydroxyethyl phthalic acid, dimethylol tricyclodecane diacrylate, etoxylated phenyl acrylate, 2-acryloyloxyethyl succinic acid, nonylphenol EO adduct acrylate, modified glycerin triacrylate, bisphenolA diglycidylether acrylic acid adduct, modified bisphenolA diacrylate, phenoxy-polyethyleneglycol acrylate, 2-acryloyloxyethyl hexahydro phthalic acid, PO adduct of bisphenolA diacrylate, bisphenolA EO adduct diacrylate, dipentaerythritol hexaacrylate, pentaerythritol triacrylate tolylenediisocyanate urethane prepolymer, lactone-denatured flexible acrylate, butoxyethyl acrylate, propyleneglycol diglycidylether acrylic acid adduct, pentaerythritol triacrylate hexamethylenediisocyanate urethane prepolymer, 2-hydroxyethyl acrylate, methoxydipropyleneglycol acrylate, ditrimethylolpropane tetraacrylate, pentaerythritol triacrylate hexamethylenediisocyanate urethane prepolymer, stearyl acrylate, isoamyl acrylate, isomyristyl acrylate, isostearyl acrylate, lactone-modified acrylate, and the like.

These acrylate compounds, which have been used as polymerizable compounds for UV-curable inks, are preferable, because they exhibit low in skin irritation or sensitization (easiness of getting rash), stable ink ejection at a relatively low viscosity, favorable polymerization sensitivity and favorable adhesion to a recording medium.

A preferable embodiment is an embodiment in which at least three kinds of monomer compounds selected from monofunctional, bifunctional, tri- or multifunctional monomers are used in combination, from the viewpoint of further improving sensitivity, ink bleeding, and adhesion to a recording medium while maintaining safety.

As a mono-acrylate, stearyl acrylate, isoamyl acrylate, isomyristyl acrylate, and isostearyl acrylate are preferable, in view of providing high sensitivity and prevention of curling due to shrinking as well as prevention of bleeding or odor of printed matter, and cost reduction of radiation devices.

As an oligomer that may be used in combination with the mono-acrylate, an epoxy acrylate oligomer and an urethane acrylate oligomer are particularly preferable.

In addition, methacrylate has more advantage in low skin irritation than acrylate.

In addition, as the polymerizable monomer D, from the viewpoint of curing speed, flexibility after curing, and adhesion to a recording medium, a compound having a nitrogen atom and a polymerizable unsaturated bond in a molecule thereof is also preferable. A compound selected from acrylate or methacrylate that includes a nitrogen atom therein or N-vinyl lactams is also preferable.

Cationically Polymerizable Compound

As the polymerizable monomer D which may be used in the present invention, a cationically polymerizable compound may be used. Various kinds of publicly known cationically polymerizable monomers known as cationically photopolymerizable compounds may be used without any particular limitation as long as the monomers initiate polymerization and cure by an action of acid that is generated from a photo-acid generating agent. Examples of the cationically polymerizable compounds include an epoxy compound; a vinyl ether compound; and an oxetane compound, which are described in, for example, JP-A Nos. 6-9714, 2001-31892, 2001-40068, 2001-55507, 2001-310938, 2001-310937, and 2001-220526.

Examples of the epoxy compound include an aromatic epoxide, an alicyclic epoxide, and an aliphatic epoxide.

As the aromatic epoxide, a di- or poly-glycidyl ether, which is produced through reaction between a polyphenol having at least one aromatic nucleus or an alkylene oxide adduct thereof and epichlorohydrin, is usable. Examples thereof include a di- or poly-glycidyl ether of bisphenolA or an alkylene oxide adduct thereof; a di- or poly-glycidyl ether of hydrogenated bisphenolA or an alkylene oxide adduct thereof; and a novolak epoxy resin. Here, the alkylene oxide includes ethylene oxide and propylene oxide.

As the alicyclic epoxide, a compound that includes therein cyclohexene oxide or cyclopentene oxide is preferable, which is obtained by epoxidizing a compound that has at least one cycloalkane ring such as a cyclohexene or cyclopentene ring with an appropriate oxidizing agent such as hydrogen peroxide or peracid.

As the aliphatic epoxide, a di- or poly-glycidyl ether of an aliphatic polyol or an alkylene oxide adduct thereof is usable. Typical examples of the aliphatic epoxide include a diglycidyl ether of an alkylene glycol such as diglycidyl ether of ethylene glycol, diglycidyl ether of propylene glycol, or diglycidyl ether of 1,6-hexanediol; a polyglycidyl ether of a polyol such as di- or tri-glycidyl ether of glycerin or an alkylene oxide adduct thereof; and a diglycidyl ether of a polyethylene glycol represented by a diglycidyl ether of polyalkylene glycol or an alkylene oxide adduct thereof or a diglycidyl ether of polypropylene glycol or an alkylene oxide adduct thereof. Here, examples of the alkylene oxide include ethylene oxide and propylene oxide.

The epoxy compound may be monofunctional or polyfunctional.

Examples of the monofunctional epoxy compound which may be used in the present invention include phenylglycidyl ether; p-tert-butylphenylglycidyl ether; butylglycidyl ether; 2-ethylhexylglycidyl ether; allylglycidyl ether; 1,2-butylene oxide; 1,3-butadiene mono-oxide; 1,2-epoxy dodecane; epichlorohydrin; 1,2-epoxy decane; styrene oxide; cyclohexene oxide; 3-methacryloxy methyl cyclohexene oxide; 3-acryloyloxy methyl cyclohexene oxide; and 3-vinyl cyclohexene oxide.

Examples of the polyfunctional epoxy compound include: bisphenol A diglycidyl ether; bisphenol F diglycidyl ether; bisphenol S diglycidyl ether; brominated bisphenol A diglycidyl ether; brominated bisphenol F diglycidyl ether; brominated bisphenol S diglycidyl ether; epoxy novolak resin; hydrogenated bisphenolA diglycidyl ether; hydrogenated bisphenolF diglycidyl ether; hydrogenated bisphenolS diglycidyl ether; 3,4-epoxy cyclohexylmethyl-3',4'-epoxycyclohexane carboxylate; 2-(3,4-epoxy cyclohexyl-5,5-spiro-3,4-epoxy)cyclohexane-meta-dioxane; bis(3,4-epoxy cyclohexylmethyl)adipate; vinylcyclohexene oxide; 4-vinylepoxycyclohexane; bis(3,4-epoxy-6-methylcyclohexylmethyl)adipate; 3,4-epoxy-6-methylcyclohexyl-3',4'-epoxy-6'-methylcyclohexane carboxylate; methylenebis(3,4-epoxycyclohexane); dicyclopentadiene diepoxide; di(3,4-epoxycyclohexylmethyl)ether of ethylene glycol; ethylenebis(3,4-epoxycyclohexane carboxylate); dioctyl epoxyhexahydro phthalate; di-2-ethylhexyl epoxyhexahydro phthalate; 1,4-butanediol diglycidyl ether; 1,6-hexanediol diglycidyl ether; glycerin triglycidyl ether; trimethylolpropane triglycidyl ether; polyethylene glycol diglycidyl ether; polypropylene glycol diglycidyl ethers; 1,1,3-tetradecadiene dioxide; limonene dioxide; 1,2,7,8-diepoxy octane; and 1,2,5,6-diepoxy cyclo-octane.

Among these epoxy compounds, the aromatic epoxide and the alicyclic epoxide are preferable in view of advantage in curing speed. The alicyclic epoxide is particularly preferable.

Further, as the polymerizable monomer D, a vinyl ether compound is usable. The vinyl ether compound exhibits reactivity either in radical polymerization or in cationic polymerization.

Example of the vinyl ether compound include a di- or tri-vinyl ether compound such as ethylene glycol divinyl ether, diethylene glycol divinyl ether, triethylene glycol divinyl ether, propylene glycol divinyl ether, dipropylene glycol divinyl ether, butane diol divinyl ether, hexane diol divinyl ether, cyclohexane dimethanol divinyl ether, or trimethylol propane trivinyl ether; and a monovinyl ether compound such as ethylvinyl ether, n-butylvinyl ether, isobutylvinyl ether, octadecylvinyl ether, cyclohexylvinyl ether, hydroxybutylvinyl ether, 2-ethylhexylvinyl ether, cyclohexane dimethanol monovinyl ether, n-propylvinyl ether, isopropylvinyl ether, isopropenyl ether-O-propylene carbonate, dodecylvinyl ether, diethylene glycol monovinyl ether, or octadecylvinyl ether.

The vinyl ether compound may be monofunctional or multifunctional.

Specific examples of the monofunctional vinyl ether include: methylvinyl ether; ethylvinyl ether; propylvinyl ether; n-butylvinyl ether; t-butylvinyl ether; 2-ethylhexylvinyl ether; n-nonylvinyl ether; laurylvinyl ether; cyclohexylvinyl ether; cyclohexylmethylvinyl ether; 4-methylcyclohexylmethylvinyl ether; benzylvinyl ether; dicyclopentenylvinyl ether; 2-dicyclopentenoxy ethylvinyl ether; methoxy ethylvinyl ether; ethoxy ethylvinyl ether; butoxy ethylvinyl ether; methoxyethoxy ethylvinyl ether; ethoxyethoxy ethylvinyl ether; methoxy polyethylene glycol vinyl ether; tetrahydro furfuryl vinyl ether; 2-hydroxy ethylvinyl ether; 2-hydroxy propylvinyl ether; 4-hydroxy butylvinyl ether; 4-hydroxy methylcyclohexylmethylvinyl ether; diethylene glycol monovinyl ether; polyethylene glycol vinyl ether; chloroethylvinyl ether; chlorobutylvinyl ether; chloroethoxy ethylvinyl ether; phenylethylvinyl ether; and phenoxy polyethylene glycol vinyl ether.

Examples of the polyfunctional vinyl ether include divinyl ethers such as ethylene glycol divinyl ether, diethylene glycol divinyl ether, polyethylene glycol divinyl ether, propylene glycol divinyl ether, butylene glycol divinyl ether, hexane diol divinyl ether, a bisphenolA alkylene oxide divinyl ether, or a bisphenol F alkylene oxide divinyl ether; and polyfunctional vinyl ethers such as trimethylolethane trivinyl ether, trimethylolpropane trivinyl ether, ditrimethylolpropane tetravinyl ether, glycerin trivinyl ether, pentaerythritol tetravinyl ether, dipentaerythritol pentavinyl ether, dipentaerythritol hexavinyl ether, ethylene oxide-added trimethylolpropane trivinyl ether, propylene oxide-added trimethylolpropane trivinyl ether, ethylene oxide-added ditrimethylolpropane tetravinyl ether, propylene oxide-added ditrimethylolpropane tetravinyl ether, ethylene oxide-added pentaerythritol tetravinyl ether, propylene oxide-added pentaerythritol tetravinyl ether, ethylene oxide-added dipentaerythritol hexavinyl ether, or propylene oxide-added dipentaerythritol hexavinyl ether.

As the vinyl ether compound, di- or tri-vinyl ether compounds are preferable from the viewpoint of curing properties, adhesion to a recording medium, surface hardness of the formed images, or the like. The divinyl ether compounds are particularly preferable.

A molecular weight of the polymerizable monomer D in the present invention is preferably from 130 to 3,000, and more preferably from 130 to 500, in terms of weight average molecular weight.

A content of the polymerizable monomer D in a total solid content of the ink composition of the present invention is preferably from 50% by mass to 95% by mass, more preferably from 60% by mass to 90% by mass, and still more preferably from 70% by mass to 90% by mass. Within the above ranges, a coating film with favorable curing properties and flexibility may be attained.

Other Ingredients

To the ink composition of the invention, ingredients other than the above can be further added. The ingredients will be described one by one below.

Colorant

The ink composition of the invention may further include a colorant in accordance with the purpose. When the ink composition contains a colorant, an ink composition with which a visible image (color image) can be formed is obtained.

The colorant that can be used in the ink composition is not particularly limited, and any one of various known colorants (including pigments and dyes) may be selected and used in depending on the application. For example, for forming an image having excellent weather resistance, a pigment is preferably used. Regarding the dyes, either a water-soluble dye or an oil-soluble dye may be used, but an oil-soluble dye is preferable.

Pigment

First, description is given to a pigment which is preferably used as the colorant in the ink composition. When a pigment is used as the colorant, excellent light fastness can be imparted to a color image formed using the ink composition.

The pigment is not particularly limited, and any one of commercially-available organic pigments and inorganic pigments, a dispersion of dispersing a pigment in an insoluble resin or the like as a dispersing medium, a pigment having a surface on which a resin is grafted, and the like may be used. Alternatively, a resin particle colored with a dye may be used.

Examples of the pigment include pigments disclosed in, for example, Seijiro Ito, the "Ganryo no Jiten" (2000); W. Herbst, K. Hunger "Industrial Organic Pigments"; JP-A Nos. 2002-12607, 2002-188025, 2003-26978, and 2003-342503.

Specific examples of the organic pigments and inorganic pigment which may be used in the invention include compounds disclosed in paragraphs [0126] to [0131] of JP-A No. 2008-13646, and any one of the compounds may be used in the invention.

The pigment may be dispersed using, for example, a dispersion apparatus such as a ball mill, a sand mill, an attritor, a roll mill, a jet mill, a homogenizer, a paint shaker, a kneader, an agitator, a HENSCHEL mixer, a colloid mill, an ultrasonic homogenizer, a pearl mill, or a wet-type jet mill.

A dispersant may be added when the pigment is dispersed. Examples of the dispersant include hydroxyl group-containing carboxylic acid esters, salts of long-chain polyaminoamides and high-molecular-weight acid esters, salts of high-molecular-weight polycarboxylic acids, high-molecular-weight unsaturated acid esters, high-molecular-weight copolymers, modified polyacrylates, aliphatic polyvalent carboxylic acids, naphthalenesulfonic acid/formalin condensates, polyoxyethylene alkyl phosphates, and pigment derivatives. It may be preferable to use a commercially-available polymer dispersant such as SOLSPERSE series available from The Lubrizol Corporation.

As a dispersion aid, a synergist may be used depending on the various pigments. It is preferable that the dispersant and the dispersion aid be added in an amount of from 1 to 50 parts by mass with respect to 100 parts by mass of the pigment.

In the ink composition, a solvent may be added as a dispersion medium for dispersing various components such as the pigment. Alternatively, the polymerizable compound which is a low-molecular-weight component may be used as a dispersion medium in the absence of a solvent. However, since the ink composition of the invention is a radiation-curable ink and the ink is cured after being applied onto a recording medium, it is preferable that no solvent be used. The reason thereof is that, if a solvent is left in an image formed by the cured ink, the solvent resistance may be deteriorated, and problems caused by the volatile organic compound (VOC) included in the remaining solvent may arise. In this regard, it is preferable to use a polymerizable compound as a dispersant, and is particularly preferable to use a polymerizable compound selected from cation-polymerizable monomers having the lowest viscosities, from the viewpoints of dispersion suitability and improvement in handling property of the ink composition.

A volume-average particle diameter of pigment particles in the ink composition is preferably from 0.02 μm to 0.60 μm, and more preferably from 0.02 μm to 0.10 μm. The maximum particle diameter is preferably 3 μm or less, and more preferably 1 μm or less, and the pigment, dispersant, and dispersion medium, the dispersion conditions, and the filtration conditions are appropriately selected so that the particle diameter falls within the above ranges. By controlling the particle diameter, clogging of a head nozzle can be suppressed, and favorable ink storage stability, ink clarity, and curing sensitivity can be attained.

Dye

Next, description is given to a dye which may be preferably used as the colorant to be used in the invention.

Any dye that is appropriately selected from conventionally known dyes may be used. Specific examples thereof include compounds as disclosed in paragraphs [0023] to [0089] of JP-A No. 2002-114930 and paragraphs [0136] to [0140] of JP-A No. 2008-13646, and any one of the compounds may be used in the invention.

The colorant is added to the ink composition in an amount of preferably from 0.05 to 20% by mass, and more preferably from 0.2 to 10% by mass, with respect to the total mass of the ink composition. When an oil-soluble dye is used as the colorant, the amount of the oil-soluble dye is preferably from 0.2 to 6% by mass with respect to a total amount (including the solvent) of the ink composition.

Sensitizing Dye

In order to promote decomposition of the photopolymerization initiator by irradiation of active radiation, a sensitizing dye can be added to the ink composition of the invention. The sensitizing dye absorbs a specific active radiation to take an electronically excited state. The sensitizing dye in the electronically excited state contacts the polymerization initiator to cause the action, such as electron transfer, energy transfer, or heat generation, thereby promoting a chemical change of the photopolymerization initiator, i.e., decomposition and generation of radical, acid, or base.

As the sensitizing dye, compounds which are in response to a wavelength of active radiation that causes generation of a polymerization initiation species in the polymerization initiator used in the ink composition may be used. Considering the application for curing reactions of general ink compositions, preferable examples of the sensitizing dye include dyes belonging to the compound groups listed below and having an absorption wavelength in the wavelength range of 350 nm to 450 nm.

Examples include polynuclear aromatic compounds (e.g., anthracene, pyrene, perylene, and triphenylene), thioxanthones (e.g., isopropyl thioxanthone), xanthenes (e.g., fluorescein, eosin, erythrocin, rhodamine B, and rose bengal), cyanines (e.g., thiacarbocyanine and oxacarbocyanine), merocyanines (e.g., merocyanine and carbomerocyanine), thiazines (e.g., thionine, methylene blue, and toluidine blue), acridines (e.g., acridine orange, chloroflavine, and acriflavine), anthraquinones (e.g., anthraquinone), squaryliums (e.g., squarylium), and coumarins (e.g., 7-diethylamino-4-methylcoumarin). Preferable examples include polynuclear aromatic compounds and thioxanthones.

In addition to the above, sensitizing dyes described in JP-A No. 2008-95086 are also preferable.

Co-Sensitizer

The ink composition of the invention may further include a co-sensitizer. In the invention, the co-sensitizer may function to enhance the sensitivity of the sensitizing dye to active radiation, or to suppress polymerization inhibition of the polymerizable compound, which is caused by oxygen.

Examples of the co-sensitizer include amines such as compounds as disclosed in, for example, M. R. Sander et al., "Journal of Polymer Science", vol. 10, p. 3173 (1972), JP-B No. 44-20189, JP-A Nos. 51-82102, 52-134692, 59-138205, 60-84305, 62-18537, and 64-33104, and Research Disclosure vol. 33825, and specific examples include triethanolamine, ethyl p-dimethylaminobenzoate, p-formyldimethylaniline, and p-methylthiodimethylaniline.

Examples of other co-sensitizer include thiols and sulfides, for example, thiol compounds disclosed in JP-A No. 53-702, JP-B No. 55-500806, and JP-A No. 5-142772; and disulfide compounds disclosed in JP-A No. 56-75643. Specifically, 2-mercaptobenzothiazole, 2-mercaptobenzoxazole, 2-mercaptobenzoimidazole, 2-mercapto-4(3)-quinazoline, and β-mercaptonaphthalene are exemplified.

Other examples of the co-sensitizer include amino acid compounds (for example, N-phenylglycine), organic metal compounds disclosed in JP-B No. 48-42965 (for example, tributyltin acetate), hydrogen-donating compounds disclosed in JP-B No. 55-34414, sulfur compounds disclosed in JP-A No. 6-308727 (for example, trithiane), phosphor compounds disclosed in JP-A No. 6-250387 (for example, diethyl phosphite), and Si—H and Ge—H compounds disclosed in JP-A No. 8-65779.

Chain Transfer Agent

The ink composition of the present invention may also include therein a chain transfer agent. In the present invention, the chain transfer agent is effective for enhancing sensitivity of hardened matter and flexibility of film properties. As the chain transfer agent, conventional chain transfer agents described in the "Polymer Handbook" (4th Edition) can be used. Thiols are a preferable chain transfer agent, and examples thereof include 2-mercaptobenzoxazole; 2-mercaptobenzthiazole; 2-mercaptobenzimidazole; 4-methyl-4H-1,2,4-triazole-3-thiol; 4,4-thiobisbenzenethiol; p-bromobenzenethiol; thiocyanuric acid; 1,4-bis(mercaptomethyl)benzene; and p-toluenethiol. Thiols described in U.S. Pat. No. 4,414,312 or JP-A No. 64-13144; disulfides described in JP-A No. 2-291561; thiones described in U.S. Pat. No. 3,558,322 or JP-A No. 64-17048; and O-acylthiohydroxamate or N-aloxypyridinethiones described in JP-A No. 2-291560 can be also used. From the viewpoint of storage stability, in particular, a compound having a secondary thiol group or an aromatic dithiol group is more preferable.

Stabilizing Agent

Examples of a stabilizing agent of the present invention include p-methoxy phenol; hydroquinone; methoxy benzoquinone; phenothiazine; catechols; alkylphenols; alkylbisphenols; zinc dimethyldithiocarbamate; copper dimethyldithiocarbamate; copper dibutyldithiocarbamate; copper salicylate; thiodipropionic acid esters; mercaptobenzimidazole; and phosphites. Particularly, p-methoxyphenol, catechols, and phenols are preferable.

The stabilizing agent may be used singly or in combination of two or more kinds thereof. The addition amount of the polymerization inhibitor is from 100 ppm to 10,000 ppm, preferably from 300 ppm to 2,000 ppm, and more preferably from 500 ppm to 1,000 ppm, with respect to a total mass of ink.

Polymerization Inhibitor

From the viewpoint of enhancing storability, a polymerization inhibitor may be added. When the ink composition of the present invention is used as an ink composition for ink-jet recording, the ink composition is preferably heated at a temperature from 40° C. to 80° C. so as to be ejected at a low viscosity. For an additional purpose of preventing head clogging caused by heat polymerization, the polymerization inhibitor is preferably added. The polymerization inhibitor is added in an amount of preferably from 200 ppm to 20,000 ppm, more preferably from 300 ppm to 2,000 ppm, and still more preferably from 500 ppm to 1,000 ppm, with respect to a total amount of the ink composition of the present invention. Preferable examples of the polymerization inhibitor include p-methoxy phenol; quinones such as hydroquinone or methoxy benzoquinone; phenothiazine; catechols; alkylphenols; alkylbisphenols; zinc dimethyldithiocarbamate; copper dimethyldithiocarbamate; copper dibutyldithiocarbamate; copper salicylate; thiodipropionic acid esters; mercaptobenzimidazole; and phosphites. p-Methoxyphenol, catechols, and quinones are preferable. Particularly, hydroquinone, benzoquinone, p-methoxy phenol, TEMPO, TEMPOL, cupferron A1, tris(N-nitroso-N-phenylhydroxylamine) aluminum salt, and the like are more preferable.

Ultraviolet Absorber

The ink composition of the invention may further include an ultraviolet absorber from the viewpoints of improving weather resistance and preventing discoloration of the obtained image.

Examples of the ultraviolet absorber include: benzotriazole compounds disclosed in, for example, JP-A Nos. 58-185677, 61-190537, 2-782, 5-197075, and 9-34057; benzophenone compounds disclosed in, for example, JP-A Nos. 46-2784 and 5-194483, and U.S. Pat. No. 3,214,463; cinnamic acid compounds disclosed in, for example, JP-B Nos. 48-30492 and 56-21141 and JP-A No. 10-88106; triazine compounds disclosed in, for example, JP-A Nos. 4-298503, 8-53427, 8-239368, 10-182621, and 8-501291; and compounds disclosed in Research Disclosure No. 24239, and compounds that absorb ultraviolet ray and emit fluorescence, that is, so-called fluorescent brighteners, which are typified by stilbene compounds and benzoxazole compounds.

The amount to be added is appropriately selected depending on the purpose, but, in general, is preferably from 0.5 to 15% by mass in terms of solid content.

Antioxidant

The ink composition of the invention may further include an antioxidant for improving stability.

Examples of the antioxidant includes those disclosed, for example, in EP Patent Nos. 223739, 2309401, 309402, 310551, 310552, and 459416, DE Patent No. 3435443, JP-A Nos. 54-48535, 62-262047, 63-113536, 63-163351, 2-262654, 2-71262, 3-121449, 5-61166, and 5-119449, and U.S. Pat. Nos. 4,814,262 and 4,980,275.

The addition amount is appropriately selected depending on purposes, but is preferably from 0.1 to 8% by mass in terms of solid content.

Discoloration Inhibitor

The ink composition of the invention may further include any of various organic or metal complex discoloration inhibitors.

Examples of the organic discoloration inhibitors include hydroquinones, alkoxyphenols, dialkoxyphenols, phenols, anilines, amines, indanes, chromanes, alkoxyanilines, and hetero rings.

Examples of the metal complex discoloration inhibitors include nickel complexes and zinc complexes. Specifically, any of the compounds disclosed in the patent publications cited in Research Disclosure No. 17643, VII-I to VII-J, Research Disclosure No. 15162, Research Disclosure No. 18716, p. 650, left column, Research Disclosure No. 36544, p. 527, Research Disclosure No. 307105, p. 872, and Research Disclosure No. 15162; and the compounds that are fallen within the general formula and exemplary compounds that are the representative compounds, as disclosed in pp. 127-137 of JP-A No. 62-215272, may be used.

The addition amount is appropriately selected depending on purposes, but is preferably from 0.1 to 8% by mass in terms of solid content.

Solvent

A minute amount of a non-curable organic solvent may be added to the ink composition of the invention in order to improve adhesiveness between the ink composition and a recording medium (base material).

Examples of the solvent include: ketone solvents such as acetone, methyl ethyl ketone, and diethylketone; alcohol solvents such as methanol, ethanol, 2-propanol, 1-propanol, 1-butanol, and tert-butanol; chlorine-containing solvents such as chloroform and methylene chloride; aromatic solvents such as benzene and toluene; ester solvents such as ethyl acetate, butyl acetate, and isopropyl acetate; ether solvents such as diethyl ether, tetrahydrofuran, and dioxane; and glycol ether solvents such as ethylene glycol monomethyl ether and ethylene glycol dimethyl ether.

It is effective to add a solvent in such an amount such that problems to solvent resistance, VOC, and the like are not caused, and the amount is preferably from 0.1 to 5% by mass, and more preferably from 0.1 to 3% by mass, with respect to the entire ink composition.

Polymer Compound

Any of various polymer compounds may be added to the ink composition of the invention in order to control film properties.

Examples of the polymer compounds include acrylic polymers, polyvinyl butyral resins, polyurethane resins, polyamide resins, polyester resins, epoxy resins, phenol resins, polycarbonate resins, polyvinyl butyral resins, polyvinyl formal resins, shellac, vinyl resins, acrylic resins, rubber resins, waxes, and other natural resins. A combination of two or more of the polymer compounds may be used. In particular, a vinyl copolymer obtained by copolymerization of acrylic monomers is preferable. Furthermore, for the purpose of improving tacking property in a case in which a film of the ink composition is formed, a polymer compound that is likely to segregate at the surface of the film is preferably used.

As the polymer compounds, fluorine atom-containing polymer compounds or polymers having a long chain-alkyl group at the side chain, as described, for example, in [0017] to [0037] of JP-A No. 2008-248119, and [0015] to [0034] of JP-A No. 2005-250890, may be used.

Surfactant

The ink composition of the invention may further include a surfactant.

Examples of the surfactant include those disclosed in JP-A Nos. 62-173463 and 62-183457. Specific examples thereof include: nonionic surfactants such as polyoxyethylene alkyl ethers, polyoxyethylene alkyl allyl ethers, acetylene glycols, and polyoxyethylene/polyoxypropylene block copolymers.

Alternatively, an organic fluoro compound may be used instead of the surfactant.

The organic fluoro compound is preferably hydrophobic. Examples of the organic fluoro compound include fluorine-containing surfactants, oily fluorine-containing compounds (for example, fluorinated oil), and solid fluorine-containing resins (for example, tetrafluoroethylene resins), and more specifically, those disclosed in JP-B No. 57-9053 (columns 8-17) and JP-A No. 62-135826.

If needed, any other additives such as a leveling additive, a matting agent, waxes for controlling film properties, or a tackifier, which does not inhibit polymerization, for improving adhesiveness to a recording medium made of polyolefin, PET, or the like, may be added to the ink composition.

Specifically, the tackifier may be a high-molecular-weight adhesive polymer disclosed in pp. 5-6 of JP-A No. 2001-49200 (for example, copolymers obtained from an ester of (meth)acrylic acid and an alcohol having an alkyl group having 1 to 20 carbon atoms, an ester of (meth)acrylic acid and an alicyclic alcohol having 3 to 14 carbon atoms, and an ester of (meth)acrylic acid and an aromatic alcohol having 6 to 14 carbon atoms), or a low-molecular-weight adhesion-imparting resin having a polymerizable unsaturated bond.

Preferable Physical Properties of Ink Composition

When the ink composition is applied to inkjet recording, a viscosity of the ink composition at a temperature in terms of ink ejection (for example, from 40° C. to 80° C., and more preferably from 25° C. to 30° C.) is preferably from 7 to 30 mPa·s, and more preferably from 7 to 20 mPa·s, in view of ejectionability. For example, a viscosity of the ink composition at room temperature (25° C. to 30° C.) is preferably from 35 to 500 mPa·s, and more preferably from 35 to 200 mPa·s.

It is preferable to appropriately control the formulation of the ink composition so that the viscosity thereof falls within the above ranges. Adjustment of the viscosity at room temperature to a higher degree enables to prevent ink penetration into a recording medium even when a porous recording medium is used. As a result, uncured monomer and odor can be reduced. Furthermore, ink bleeding at the time of impact of ink droplets can be suppressed; and as a result, favorably image quality can be improved.

A surface tension of the ink composition is preferably from 20 to 30 mN/m, and more preferably from 23 to 28 mN/m. When recording is carried out on various recording media such as a polyolefin, PET, a coat paper, a non-coat paper, or the like, the surface tension is preferably 20 mN/m or more from the viewpoints of bleeding and penetration, and is preferably 30 mN/m or less from the viewpoint of wettability.

The ink composition is preferably used for inkjet recording. When used in inkjet recording, the recording is carried out in such a manner that the ink composition is ejected onto a recording medium using an inkjet recording apparatus, and the ejected ink composition is then irradiated with radiation to cure the ink composition.

On the printed matter obtained by using the ink composition, an image area is cured by irradiating radiation such as ultraviolet ray, which results in the image area with excellent strength. Therefore, in addition to the image formation with an ink composition, the ink composition may be used for various applications such as formation of an ink-receiving layer (image area) of a planographic printing plate.

Inkjet Recording Method and Printed Matter

An inkjet recording method that is preferably used in the invention is described below.

The inkjet recording methods of the invention is a method of producing printed matter, the method including: a process of applying the active radiation curable ink composition as described above onto a recording medium so as to form an image; and a process of curing the image by irradiating active radiation thereon.

In the above-described method of producing printed matter, a molded article of printed matter can be produced by using a base material made of a moldable resin material as a recording medium and including a process of molding and processing the base material on which a cured image has been formed.

The recording medium (base material) which may be used in the inkjet recording method is not particularly limited, and examples thereof include: paper such as a generally-used non-coated paper and a coated paper; and various non-absorbable resin materials used for soft packing, and resin films formed from the non-absorbable resin materials. Examples of various plastic films include PET films, OPS films, OPP films, ONy films, PVC films, PE films, and TAC films. Furthermore, examples of plastics which may be used as a material of the recording medium include polycarbonate, acrylic resins, ABS, polyacetal, PVA, and rubbers. Alternatively, a recording medium made of a metal or a glass may be used.

The recording medium which may be used in the invention may be a support of a planographic printing plate.

Examples of the active radiation that can be used in the inkjet recording method of the invention include α-ray, γ-ray, X-ray, ultraviolet ray, visible light ray, infrared ray, and electron beam. The peak wavelength of the active radiation is preferably from 200 nm to 600 nm, more preferably from 300 nm to 450 nm, and still more preferably from 350 nm to 420 nm. A power of the active radiation is preferably 2,000 mJ/cm$^2$ or less, more preferably from 10 to 2,000 mJ/cm$^2$, still more preferably from 20 to 1,000 mJ/cm$^2$, and still more preferably from 50 to 800 mJ/cm$^2$.

In the inkjet recording method of the invention, it is particularly preferable that the radiation be emitted from a light emitting diode such that an ultraviolet ray having a emission wavelength peak of 350 nm to 420 nm is emitted, and the maximum illumination intensity at the surface of the recording medium is from 10 to 2,000 mW/cm$^2$. The ink composition of the invention can be cured at high sensitivity even when a lower exposure amount of light, such as a light from a light-emitting diode, is used.

In the inkjet recording method of the invention, since the ink composition of the invention is used, and is cured by irradiation of an active radiation, an image having excellent rub resistance, a surface of the image having a reduced sticky texture may be formed. The irradiation with active radiation may be carried out at one time after all of the ink compositions having different colors from each other are ejected, but light exposure is preferably performed with respect to each color after the ink composition is ejected, from the viewpoint of promoting curing.

In the printed matter of the invention, an image is formed with the ink composition of the invention by the inkjet recording method (inkjet recording method of the invention). This allows the printed matter to have an image having excellent rub resistance and a reduced stickiness on the surface of the image.

The ink composition of the invention is favorably applied to an image formation of common printed matters as described above. In addition, the ink composition can be preferably used also in an embodiment in which a processing (manufacturing) is performed after forming an image on a recording medium, such as a support.

In these days, the printed matter to which a molding (forming) processing has been subjected, such as decorative sheets, is used in various applications. For example, a membrane switch surface sheet used for electrical appliance or the like is obtained in such a manner that an image is formed on a thin plastic sheet (for example, a PET, polycarbonate, or polystyrene sheet having a film thickness of about 100 μm), and then the sheet is subjected to embossing in order to impart a suitable click texture to a switch portion (click portion). Moreover, there are many cases where printed matter on which an image has been formed is subjected to embossing, in order to finish a mat-style-printed matter, or to impart three-dimensional texture to the printed matter, or the like.

Moreover, in widely-distributed automatic vending machines of beverages such as drinking water, tea, or juice, dummies of the actually sold products are displayed. The dummies are produced in such a manner that a flat support obtained by subjecting a transparent thermoplastic resin sheet to decorative printing (i.e., an image is formed) is subjected to deep-draw processing so as to obtain a half in lengthwise of a full-scale beverage case, whereby a formed product (in some cases, with deep-draw molding of 25 mm or more) is produced, which has a configuration enabling strong appeal of the product image thereof when irradiated by light from the back thereof.

As a processing method for manufacturing a deep drawing molded article of the decorated thermoplastic resin sheets, vacuum molding, pressure molding, or vacuum pressure molding is most preferable. The vacuum molding theoretically includes preheating a flat support to a temperature at which the support can be thermally transformed in advance, drawing the same into a die by a vacuum, attaching the same to the die by press while stretching, and then cooling the same. The pressure molding includes pressing the support from the side opposite to the die, attaching the same to the die by pressurizing, and then cooling the same. In the vacuum pressure molding, the vacuum and the pressure are simultaneously performed.

The ink used for the printed matter which has been subjected to the processing is demanded to have properties such that cracking, releasing or the like of the obtained image (printed matter) hardly occurs, and that the cured film has excellent impact resistance, excellent flexibility, and excellent adhesiveness with a base material. In this regard, when using a ink composition of the invention, the surface of a film may be efficiently cured since the ink composition of the invention includes a specific compound, so that excellent impact resistance may be attained. Furthermore, the surface hardness (i.e., non-sticky film with a high viscoelasticity) may be attained even when the bulk is formed from a flexible film (i.e., a soft film with a low viscoelasticity), so that particularly preferable effects can be exhibited when the ink composition is used in an application in which the above processing is carried out after image formation.

Among these processing methods described above, the printed matter obtained by the ink composition of the invention is preferably used for vacuum molding (forming) in particular.

Vacuum Molding, Pressure Molding, Vacuum Pressure Molding

Vacuum molding is characterized in that a support having an image formed thereon is preliminary heated to a thermally-deformable temperature in advance; and then the support is introduced into a mold by vacuum suction; and then the support is attached by press, cooled, and molded onto the mold while stretching the support. Pressure molding is characterized in that a support having an image formed thereon is preliminary heated to a thermally-deformable temperature in advance; and then the support is pressed from an opposite side of a mold, so that the support is attached by press, cooled, and molded onto the mold. Vacuum pressure molding is characterized in that the vacuum suction and the pressure are performed at the same time.

Details of the molding may be referred to the section of the "Netsuseikei (Thermoforming)" in the "Kobunshi Daijiten (Concise encyclopedia of polymer science and engineering)" (published by MARUZEN Co., Ltd.) p. 766 to 768 and the references cited in the section.

According to a first aspect of the present invention, there is provided an active radiation curable ink composition including: a polymer (A) having two or more acidic groups or two or more basic groups; a polymerizable monomer (B) having a substituent group capable of forming a counter salt with the acidic groups or the basic groups of the polymer (A); a photo-polymerization initiator (C); and a polymerizable monomer (D) having a different structure from the polymerizable monomer (B).

According to a second aspect of the present invention, there is provided the active radiation curable ink composition as described in the first aspect, wherein an amount of the substituent group of the polymerizable monomer (B) capable of forming a counter salt is in the range of from 0.2 to 1, in terms of equivalence, with respect to the amount of the acidic groups or the basic groups of the polymer (A) that has two or more acidic groups or two or more basic groups.

According to a third aspect of the present invention, there is provided the active radiation curable ink composition as described in the first or second aspect, wherein the polymer (A) that has two or more acidic groups or two or more basic groups includes therein at least one partial structure selected from the group consisting of (i) a fluorine-substituted hydrocarbon group, (ii) a siloxane structure, and (iii) a long-chain alkyl group.

According to a forth aspect of the present invention, there is provided the active radiation curable ink composition as described in any one of the first to third aspects, wherein the polymer (A) that has two or more acidic groups or two or more basic groups is acrylic resin.

According to a fifth aspect of the present invention, there is provided the active radiation curable ink composition as described in any one of the first to third aspects, wherein the polymer (A) that has two or more acidic groups or two or more basic groups is urethane resin or urea resin.

According to a sixth aspect of the present invention, there is provided the active radiation curable ink composition as described in any one of the first to fifth aspects, wherein the ink composition is applied to a recording medium by inkjet recording.

According to a seventh aspect of the present invention, there is provided the active radiation curable ink composition as described in any one of the first to sixth aspects, wherein the ink composition is printed on a hard surface of a base material made of a moldable resin material.

According to an eighth aspect of the present invention, there is provided a method of producing printed matter, the method including:

applying the active radiation curable ink composition as described in any one of the first to seventh aspects onto a recording medium so as to form an image; and curing the image by irradiation with active radiation.

According to a ninth aspect of the present invention, there is provided a method of forming a molded article of printed matter, the method including:

forming an image by applying the active radiation curable ink composition as described in any one of the first to seventh aspects onto a base material made of a moldable resin material;

obtaining printed matter by irradiation with active radiation so as to cure the image; and obtaining a molded article by molding and processing the base material having a cured image formed thereon.

Details of action mechanism in the present invention is not clear, but may be presumed as follows.

The ink composition of the present invention includes therein a polymer having two or more acidic groups or two or more basic groups and a polymerizable monomer having a substituent group capable of forming a counter salt with the acidic groups or the basic groups of the polymer. Therefore, in the ink composition, the polymer and the polymerizable monomer form an association (quasi bond). As a result, the polymer is linked to the polymerizable monomer through an ionic connection and incorporates therein the polymerizable group that the polymerizable monomer possesses. Therefore, it is presumed that excellent picture quality is imparted to the resulting hardened matter without deteriorating dispersion stability of a coloring material such as pigment. In addition, the hardened matter obtained after curing has a high Tg, so that a film with high strength is obtained. As a result, it is presumed that a good balance between picture quality and film strength can be achieved.

In addition, when the polymer (A) has acidic groups, the polymerizable monomer (B) has a basic group that forms a counter salt with the acidic groups. When the polymer (A) has basic groups, the polymerizable monomer (B) has an acidic group that forms a counter salt with the basic groups.

Namely, this quasi bond is neutralized in the ink composition and exists therein without affecting dispersion stability of pigment. However, on the occasion of curing by radiation, the quasi bond behaves as a multifunctional oligomer, so that local concentration of polymerizable groups becomes high. Also, the quasi bond behaves as a quasi cross-linking point. As a whole, the ink composition is cured with high sensitivity.

Further, when printed matter is subjected to thermal molding, the quasi bond is dissociated by an action of heat or the like, thereby providing flexibility and becoming easy to mold. In printed matter or a molded article after curing or molding, it is presumed that the quail bond is formed again, so that high hardness is obtained and that film strength of the printed matter and molded article becomes high.

In addition, the polymer (A) having the specific structure has the advantage of the process in that the polymer (A) can be produced in accordance with reduced number of production steps as compared with a process in which the polymerizable polymer is prepared by introducing a polymerizable group through a covalent bond.

The first aspect of the present invention makes it possible to provide an ink composition that forms a cured image having high surface hardness and excellent flexibility and has an excellent adhesion to a recording medium and an excellent ejection stability even after long time storage. According to the second aspect of the present invention, the above-described effects of the present invention may be more conspicuous. According to the third aspect of the present invention, the above-described effects of the present invention may be more conspicuous. According to the forth aspect of the present invention, the above-described effects of the present invention may be more conspicuous. According to the fifth aspect of the present invention, the above-described effects of the present invention may be more conspicuous. By using the ink composition according to the sixth aspect of the present invention, an ink composition suitably used for inkjet printing may be provided. By using the ink composition according to the seventh aspect of the present invention, an ink composition suitably used for printing on a hard surface may be provided. According to the eight aspect of the present invention, printed matter that is excellent in surface hardness, blocking resistance, stretching property and adhesion may be provided. According to the ninth aspect of the present invention, in particular, in the case of molding printed matter that is formed using the ink composition by inkjet recording, a method of producing a molded article of printed matter that is excellent in surface hardness, blocking resistance, stretching property and adhesion may be provided.

EXAMPLE

Herein below, the present invention is more specifically described by referring to Examples; however, the present invention is not limited to these examples unless deviated from the gist of the invention. Herein below, "%" and "part(s)" are each on the mass basis unless otherwise noted.

Preparation of Pigment Dispersion

Pigment dispersion (M1) was prepared by mixing the following pigment, dispersant, and solvent described below.

Magenta Pigment Dispersion (M1)

| | |
|---|---:|
| Pigment: C.I. pigment red 57:1 | 15 parts |
| Dispersant: High molecular weight dispersant [SOLSPERSE 32000, trade name, manufactured by The Lubrizol Corporation] | 5 parts |
| Solvent: Phenoxyethylacrylate | 80 parts |

Preparation of Ink Composition

Ink compositions of Examples 1 to 34 and Comparative Examples 1 to 5 shown in Table 1 were prepared by mixing components that are shown in the following prescription of the ink compositions.

In addition, the amount of the specific polymer (A) and the amount of the polymerizable monomer (B) were selected as follows.

The specific polymer (A) was added in an amount of 4% with respect to the total amount of the ink composition. The specific monomer (B) was added in a manner that the neutralization degree shown in Table 1 was obtained with respect to acidic groups or basic groups of the specific polymer (A). For instance, the neutralization degree of 20 in Example 1 denotes that 20% of amino groups that the specific polymer possesses were neutralized with acrylic acid that is the specific monomer. The neutralization degree in Examples 2, 3, and 5 represents the amount of the acidic or basic groups of the specific polymer that were neutralized with the specific monomer. The neutralization degree of 100% denotes that the acidic groups or basic groups of the specific polymer were neutralized with equivalent amount of the specific monomer.

In Comparative Example 1, no polymer was added. In Comparative Examples 2 and 3, only a polymerizable polymer having acidic groups and only a polymerizable polymer having basic groups were added respectively. In Comparative Examples 4 and 5, only a polymerizable monomer having an acidic group and only a polymerizable monomer having a basic group were added respectively; each in an amount of 4% with respect to the total amount of each ink composition.

In addition, the specific polymer (A) and the specific monomer (B) listed in Table 1 are the aforementioned exemplified compounds.

Prescription of Ink Compositions

| | |
|---|---|
| Pigment dispersant (M1) | 4 parts |
| Specific polymer (A): compounds described in Table 1 | |
| Specific monomer (B): compounds described in Table 1 | |
| Photo-polymerization initiator (C): biphenyl benzoyl | 4 parts |
| Photo-polymerization initiator (C): "IRGACURE 819" (trade name: manufactured by Ciba Specialty Chemicals Corporation) | 5 parts |
| Photo-polymerization initiator (C): "IRGACURE 184" (trade name: manufactured by Ciba Specialty Chemicals Corporation) | 2 parts |
| Polymerizable monomer D: Phenoxyethyl acrylate | 36 parts |
| Polymerizable monomer D: N-vinylcaprolactam | 40 parts |
| Epoxy compound: "EPOXYESTER 3002A" (trade name: manufactured by KYOEISHA CHEMICAL Co., Ltd., PO-modified bisphenol A diglycidylether diacrylate) | 1 part, |
| Chain transfer agent: "KARENZ MT-PEI" (trade name: manufactured by SHOWA DENKO K.K.) | 1 part |
| Stabilizing agent: "GENORAD 16" (trade name: manufactured by Rahn Corporation) | 0.1 parts |

TABLE 1

| | (A) Specific polymer | (B) Specific monomer | Neutralization degree (%) |
|---|---|---|---|
| Example 1 | A-1 | Ba-1 | 20 |
| Example 2 | A-1 | Ba-1 | 40 |
| Example 3 | A-1 | Ba-1 | 80 |
| Example 4 | A-1 | Ba-1 | 100 |
| Example 5 | A-1 | Ba-1 | 120 |
| Example 6 | A-1 | Ba-1 | 150 |
| Example 7 | A-3 | Ba-3 | 40 |
| Example 8 | A-3 | Ba-3 | 100 |
| Example 9 | A-10 | Bb-1 | 100 |
| Example 10 | A-10 | Bb-4 | 100 |
| Example 11 | A-12 | Bb-1 | 100 |
| Example 12 | A-12 | Bb-4 | 100 |
| Example 13 | A-14 | Bb-1 | 100 |
| Example 14 | A-15 | Bb-2 | 100 |
| Example 15 | A-16 | Bb-12 | 100 |
| Example 16 | A-17 | Bb-13 | 100 |
| Example 17 | A-18 | Bb-14 | 100 |
| Example 18 | A-19 | Ba-1 | 100 |
| Example 19 | A-20 | Ba-2 | 100 |
| Example 20 | A-21 | Ba-5 | 100 |
| Example 21 | A-22 | Ba-8 | 100 |
| Example 22 | A-23 | Ba-9 | 100 |
| Example 23 | A-24 | Ba-11 | 100 |
| Example 24 | A-25 | Ba-17 | 100 |
| Example 25 | A-26 | Ba-3 | 100 |
| Example 26 | A-27 | Ba-3 | 100 |
| Example 27 | A-28 | Ba-3 | 100 |
| Example 28 | A-29 | Ba-3 | 100 |
| Example 29 | A-30 | Ba-3 | 100 |
| Example 30 | A-31 | Bb-4 | 100 |
| Example 31 | A-32 | Bb-4 | 100 |
| Example 32 | A-33 | Bb-4 | 100 |
| Example 33 | A-34 | Bb-4 | 100 |
| Example 34 | A-35 | Bb-4 | 100 |
| Example 35 | A-36 | Bb-9 | 100 |
| Example 36 | A-37 | Bb-9 | 100 |
| Comparative Example 1 | None | None | — |
| Comparative Example 2 | A-10 | None | 0 |
| Comparative Example 3 | A-1 | None | 0 |
| Comparative Example 4 | None | Ba-3 | — |
| Comparative Example 5 | None | Bb-4 | — |

Evaluation

Using each of the thus-obtained ink compositions, the following evaluations were performed. The results were shown in Table 2.

Inkjet Image Recording (Printing)

First, the prepared ink composition was subjected to filtration with a filter having an absolute filtration accuracy of 2 μm.

Subsequently, recording on a recording medium was carried out using a commercially-available inkjet recording apparatus equipped with a piezoelectric inkjet nozzle. The ink application system was composed of a base tank, a supply pipe, an ink-supply tank from which the ink is supplied to the inkjet head, a filter, and the piezoelectric inkjet head, and the components from the ink-supply tank to the inkjet head were insulated and heated. Thermosensors were provided at the vicinity of each of the ink-supply tank and the inkjet head nozzle, and the temperature was controlled so that the temperature at the nozzle portion was constantly at 70° C.±2° C. The piezoelectric inkjet head was driven so that multi-size dots of 8 pl to 30 pl were ejected at a resolution of 720×720 dpi. In the invention, the "dpi" indicates the numbers of dots per 2.54 cm.

The ink composition after filtration was discharged using the above-mentioned inkjet recording apparatus at an environmental temperature of 25° C., and ultraviolet ray was irradiated using an UV-LED (trade name: NCCU033, manufactured by Nichia Corporation). The LED outputs ultraviolet ray at a wavelength of 365 nm from one chip, and light of about 100 mW is emitted from a chip by conducting an electric current of about 500 mA. When plural LEDs were arrayed at 7 mm intervals, a power of 0.3 W/cm$^2$ may be obtained on the surface of the recording medium. The period from after dropping to exposing of the ink composition, and the exposure period may be varied by the carrying velocity of the recording medium and the distance between the head and the LED in the direction of carrying. In this example, the ink was exposed after 0.2 seconds from landing.

The exposing energy on the recording medium may be adjusted to be from 0.01 J/cm$^2$ to 15 J/cm$^2$ according to the settings of the distance between the UV-LED and the recording medium, and the carrying velocity of the recording medium. The irradiation period was a period until the time at which adhesive feeling was diminished on the image surface after irradiation of ultraviolet ray. As the recording medium, a polycarbonate sheet was used.

Under these conditions, curing sensitivity, storage stability and jetting stability of the ink composition, blocking sensitivity of the image (cured film of the ink composition) formed using the ink composition were evaluated by the following method.

Furthermore, the degree of stretching, and adhesion to the recording medium of the image (cured film of the ink composition) formed using the ink composition were evaluated under the conditions mentioned below.

Evaluation of Curing Sensitivity

An exposure energy (mJ/cm$^2$) at which stickiness sensed by finger contact (tip touch) disappears on an image surface after UV irradiation was defined as curing sensitivity. The smaller the value thereof, it shows that the sensitivity is higher. Curing is preferably performed at 4000 mJ/cm$^2$ or less.

Evaluation of Storage Stability

After the ink compositions prepared were stored at 75% RH and 60° C. for three days, the ink viscosity was determined at the jetting temperature, and increase in the ink viscosity was determined as viscosity ratio, i.e., viscosity after storage/viscosity before storage. The viscosity ratio being closer to 1.0 indicates no change in viscosity and better storage stability, which is evaluated as A, whereas nozzle clogging may be occurred at the time of ejection when an ink with the viscosity ratio exceeding 1.5 is used, which is evaluated as C.

Evaluation of Ejection Stability

The ejection stability of the ink composition (after filtration) obtained as described above at the head nozzle was evaluated as follows.

That is, the number of nozzle loss after continuous ejection using a commercially available inkjet recording apparatus with a piezoelectric inkjet nozzle for 60 minutes was measured under the following conditions.

—Conditions—
Number of channels: 318/head
Driving frequency: 4.8 kHz/dot
Ink droplets: 7 drops, 42 pl
Temperature: 45° C.

In the experiment, a method including ejecting the ink composition on a PET substrate and exposing the substrate (exposure amount: 1,000 mW/cm$^2$) was used, and the number of nozzle loss (number of clogged nozzles) in this experiment was counted.

Evaluation Criteria
A: Nozzle loss is from 0 to less than 5.
B: Nozzle loss is from 5 to less than 10.
C: Nozzle loss is 10 or more.

Evaluation of Blocking Sensitivity

Five-hundred PET sheets (size: same size in both longitudinal and width directions as that of the polycarbonate sheet on which an image had been formed, weight: 2 g/sheet) were stacked on the image which had been irradiated with ultraviolet ray, which was obtained by applying the above-mentioned inkjet recording method, and left for a day, and transfer to the PET was evaluated by visual observation. The case where transfer is not observed is evaluated as A and the case where transfer is observed is evaluated as C, and the amount of exposure energy (mJ/cm$^2$) which is required until transfer is not observed is defined as blocking sensitivity.

The allowable range of blocking sensitivity is 12,000 mJ/cm$^2$ or less, more preferably 8,000 mJ/cm$^2$ or less.

Evaluation of Degree of Stretching

A cured film of the ink composition was prepared in a similar manner to the above-mentioned inkjet image recording except that the accumulated exposure amount was adjusted to 12,000 mJ/cm$^2$ and the illuminance was adjusted to 2140 mW/cm$^2$. The cured film obtained was cut into 5 cm axis length×2.5 cm width, and stretched using a tensile tester (trade name: AUTOGRAPH AGS-J, manufactured by Shimadzu Corporation) at room temperature (20° C.) at a velocity of 30 cm/min to measure the degree of stretching at which the cured film was broken. The state in which the cured film was stretched from the original length to double length was defined as 100% degree of elongation.

The allowable range of degree of stretching may be 100% or more in order to correspond to a roll substrate, or 200% or more, and more preferably 300% or more in the case of use in applications for forming process.

Evaluation of Adhesion

A cured film of the ink composition was prepared in a similar manner to the above-mentioned inkjet image recording except that a solid image was printed on a polycarbonate sheet using the ink composition. The sample obtained was evaluated by a cross-hatch test. In this test, evaluation was made based on JISK5600 using a six point scale of 0 to 5, in which 0 was evaluated as the best and 1 was evaluated as a practically acceptable level.

Evaluation Criteria
A: 0
B: 1
C: within the range of from 2 to 5

Evaluation of Pencil Hardness

Using each cured film that is described in the above section of Adhesion evaluation, measurement of pencil hardness was performed in accordance with JIS-K5400.

Vacuum Molding Evaluation

Vacuum molding was performed using the printed matters using a vacuum molding device FORMING 300X 8 (trade name, manufactured by Seikosangyo Co., Ltd.). The wooden pattern illustrated in FIG. 1 was placed at the center of a vacuum table of the vacuum molding device, and the temperature of a heater was set so that the temperature of a 0.5 mm thick polycarbonate that functions as a support was 170° C. After the temperature of the support was increased to 170° C., the vacuum table on which the wooden pattern was placed was slowly raised while operating with a lifting table lever, thereby performing vacuum molding. The molded printed matters were visually observed whether or not cracks or white spots were generated, and then was evaluated based on the following evaluation criteria.

Evaluation Criteria
A: None of cracks and none of white spots are observed.
Z: Vacuum molding can not be carried out because the surface of printed matter is remarkably sticky.

TABLE 2

|  | Pencil hardness | Curing sensitivity (mJ/cm$^2$) | Blocking sensitivity (mJ/cm$^2$) | Degree of stretching (%, room temperature) | Storage stability | Ejection stability | Adhesion | Moldability |
|---|---|---|---|---|---|---|---|---|
| Example 1 | B | 5000 | 12000 | 300 | A | A | A | A |
| Example 2 | HB | 4000 | 9000 | 320 | A | A | A | A |
| Example 3 | H | <3000 | 8000 | 320 | A | A | A | A |
| Example 4 | H | <3000 | 6000 | 320 | A | A | A | A |
| Example 5 | H | <3000 | 6000 | 300 | C | A | A | A |
| Example 6 | H | <3000 | 6000 | 300 | C | A | A | A |
| Example 7 | H | <3000 | 10000 | 320 | A | A | A | A |
| Example 8 | H | <3000 | 8000 | 320 | A | A | A | A |
| Example 9 | H | <3000 | 8000 | 320 | A | A | A | A |
| Example 10 | H | <3000 | 8000 | 320 | A | A | A | A |
| Example 11 | H | <3000 | 8000 | 320 | A | A | A | A |
| Example 12 | H | <3000 | 8000 | 320 | A | A | A | A |
| Example 13 | 2 H | <3000 | 6000 | 320 | A | A | A | A |
| Example 14 | 2 H | <3000 | 6000 | 320 | A | A | A | A |
| Example 15 | 2 H | <3000 | 6000 | 320 | A | A | A | A |
| Example 16 | 2 H | <3000 | 6000 | 320 | A | A | A | A |

TABLE 2-continued

|  | Pencil hardness | Curing sensitivity (mJ/cm$^2$) | Blocking sensitivity (mJ/cm$^2$) | Degree of stretching (%, room temperature) | Storage stability | Ejection stability | Adhesion | Moldability |
|---|---|---|---|---|---|---|---|---|
| Example 17 | 2 H | <3000 | 6000 | 320 | A | A | A | A |
| Example 18 | 2 H | <3000 | 6000 | 320 | A | A | A | A |
| Example 19 | 2 H | <3000 | 6000 | 320 | A | A | A | A |
| Example 20 | 2 H | <3000 | 6000 | 320 | A | A | A | A |
| Example 21 | 2 H | <3000 | 6000 | 320 | A | A | A | A |
| Example 22 | 2 H | <3000 | 6000 | 320 | A | A | A | A |
| Example 23 | 2 H | <3000 | 6000 | 320 | A | A | A | A |
| Example 24 | 2 H | <3000 | 6000 | 320 | A | A | A | A |
| Example 25 | H | <3000 | 8000 | 320 | A | A | A | A |
| Example 26 | H | <3000 | 8000 | 320 | A | A | A | A |
| Example 27 | H | <3000 | 8000 | 320 | A | A | A | A |
| Example 28 | H | <3000 | 8000 | 320 | A | A | A | A |
| Example 29 | H | <3000 | 8000 | 320 | A | A | A | A |
| Example 30 | H | <3000 | 8000 | 320 | A | A | A | A |
| Example 31 | H | <3000 | 8000 | 320 | A | A | A | A |
| Example 32 | H | <3000 | 8000 | 320 | A | A | A | A |
| Example 33 | H | <3000 | 8000 | 320 | A | A | A | A |
| Example 34 | H | <3000 | 8000 | 320 | A | A | A | A |
| Example 35 | HB | <3000 | 10000 | 320 | A | A | A | A |
| Example 36 | H | <3000 | 8000 | 320 | A | A | A | A |
| Comparative Example 1 | 6 B | >6000 | >20000 | 120 | A | A | C | Z |
| Comparative Example 2 | 2 B | 6000 | 15000 | 180 | C | C | A | Z |
| Comparative Example 3 | 2 B | 6000 | 15000 | 180 | C | C | A | Z |
| Comparative Example 4 | 2 B | >6000 | 15000 | 150 | C | A | A | Z |
| Comparative Example 5 | 2 B | >6000 | 15000 | 150 | C | A | A | Z |

Table 2 shows the following.

Examples 1 to 34, in which the specific polymer used in the present invention and the specific monomer that forms a counter salt with the specific polymer were used, provided ink compositions with both favorable storage stability and favorable ejection stability and also provided cured ink compositions with high blocking sensitivity and high pencil hardness. In particular, Examples 13 to 24, in which an acrylic resin having a group with surface segregation property was used as the specific polymer, provided high blocking sensitivity and also provided cured ink compositions with high surface hardness. Advantages of Examples 13 to 24 according to the present invention were conspicuous. In addition, owing to the addition of the specific polymer and the specific monomer, degree of heat stretch was improved without degradation of adhesion. As a result, vacuum molding adaptability was enhanced.

All publications, patent applications, and technical standards mentioned in this specification were herein incorporated by reference to the same extent as if each individual publication, patent application, or technical standard was specifically and individually indicated to be incorporated by reference.

What is claimed is:

1. An active radiation curable ink composition, comprising:
   a polymer (A) having two or more acidic groups or two or more basic groups;
   a polymerizable monomer (B) having a substituent group capable of forming a counter salt with the acidic groups or the basic groups of the polymer (A);
   a photo-polymerization initiator (C); and
   a polymerizable monomer (D) having a different structure from the polymerizable monomer (B),
   wherein an amount of the substituent group of the polymerizable monomer (B) capable of forming a counter salt is in the range of from 0.2 to 1, in terms of equivalence, with respect to the amount of the acidic groups or the basic groups of the polymer (A) that has two or more acidic groups or two or more basic groups.

2. The active radiation curable ink composition according to claim 1, wherein the polymer (A) that has two or more acidic groups or two or more basic groups comprises at least one partial structure selected from the group consisting of (i) a fluorine-substituted hydrocarbon group, (ii) a siloxane structure, and (iii) a long-chain alkyl group.

3. The active radiation curable ink composition according to claim 1, wherein the polymer (A) that has two or more acidic groups or two or more basic groups comprises an acrylic resin.

4. The active radiation curable ink composition according to claim 1, wherein the polymer (A) that has two or more acidic groups or two or more basic groups comprises a urethane resin or a urea resin.

5. The active radiation curable ink composition according to claim 1, wherein the ink composition is applied to a recording medium by inkjet recording.

6. The active radiation curable ink composition according to claim 1, wherein the ink composition is printed on a hard surface of a base material made of a moldable resin material.

7. A method of producing printed matter, the method comprising:
   applying the active radiation curable ink composition according to claim 1 onto a recording medium so as to form an image; and
   curing the image by irradiation with active radiation.

8. A method of forming a molded article of printed matter, the method comprising:

forming an image by applying the active radiation curable ink composition according to claim 1 onto a base material made of a moldable resin material;

obtaining printed matter by irradiating the image with active radiation so as to cure the image; and obtaining a molded article by molding and processing the base material having a cured image formed thereon.

\* \* \* \* \*